United States Patent
Kozaki et al.

(10) Patent No.: US 11,831,260 B2
(45) Date of Patent: Nov. 28, 2023

(54) POWER CONVERTER DEVICE AND CONTROL METHOD THEREFOR

(71) Applicant: MEIDENSHA CORPORATION, Tokyo (JP)

(72) Inventors: Keiki Kozaki, Numazu (JP); Nobutaka Kezuka, Fuji (JP); Hidekazu Akaike, Fujinomiya (JP); Kenji Kobori, Shizuoka (JP)

(73) Assignee: MEIDENSHA CORPORATION, Tokyo (JP)

( * ) Notice: Subject to any disclaimer, the term of this patent is extended or adjusted under 35 U.S.C. 154(b) by 0 days.

(21) Appl. No.: 18/034,866

(22) PCT Filed: Aug. 3, 2021

(86) PCT No.: PCT/JP2021/028688
§ 371 (c)(1),
(2) Date: May 1, 2023

(87) PCT Pub. No.: WO2022/091512
PCT Pub. Date: May 5, 2022

(65) Prior Publication Data
US 2023/0327591 A1    Oct. 12, 2023

(30) Foreign Application Priority Data
Nov. 2, 2020  (JP) ................ 2020-183428

(51) Int. Cl.
*H02P 21/18* (2016.01)
*H02P 27/06* (2006.01)
*H02M 5/458* (2006.01)

(52) U.S. Cl.
CPC .......... *H02P 21/18* (2016.02); *H02M 5/4585* (2013.01); *H02P 27/06* (2013.01)

(58) Field of Classification Search
CPC .. H02P 6/00; H02P 6/005; H02P 6/007; H02P 6/06; H02P 6/08; H02P 6/16;
(Continued)

(56) References Cited

U.S. PATENT DOCUMENTS 4,647,827 A * 3/1987 Toyoda ................ G01D 5/2458
                                                              318/625

FOREIGN PATENT DOCUMENTS

JP    H01-132967 A    5/1989
JP    H05-45151 A     2/1993
(Continued)

*Primary Examiner* — Antony M Paul
(74) *Attorney, Agent, or Firm* — Foley & Lardner LLP

(57) ABSTRACT

Power conversion device has first position/rotation detector 14, second position/rotation detector 15 whose resolution per rotation of motor is higher than the first position/rotation detector 14 but whose detection cycle is slower than the first position/rotation detector 14 and encoder switching operation process unit 18. The encoder switching operation process unit 18 switches signals between the first and second position/rotation detectors 14, 15 and outputs the signal of the first position/rotation detector 14 or of the second position/rotation detector 15, or adjusts a ratio of the signal between the first and second position/rotation detectors 14, 15 and output a signal obtained by adding adjusted signals. With this, in the power conversion device, the encoder having high resolution and slow detection time and the encoder having low resolution and fast detection time are properly used according to rotation speed, and current and the rotation speed are controlled with high accuracy.

4 Claims, 25 Drawing Sheets

(58) Field of Classification Search
CPC ...... H02P 6/17; H02P 6/12; H02P 6/26; H02P 7/29; H02P 27/00; H02P 27/04; H02P 27/06; H02P 21/00; H02P 21/18; H02P 1/24; H02P 1/46; H02P 27/08; H02P 2207/05; H02P 25/022; H02P 25/14; H02P 2203/05; H02P 29/662; H04L 43/16; G06F 21/566
See application file for complete search history.

(56) References Cited

FOREIGN PATENT DOCUMENTS

| | | |
|---|---|---|
| JP | H07-229759 A | 8/1995 |
| JP | H08-336299 A | 12/1996 |
| JP | 2000-231305 A | 8/2000 |
| JP | 2010-271151 A | 12/2010 |

* cited by examiner

POWER CONVERTER DEVICE AND CONTROL METHOD THEREFOR

TECHNICAL FIELD

The present invention relates to a method of operating a power conversion device having a plurality of position/rotation detectors (hereinafter referred to as encoders) for controlling current and rotation speed of an electric motor (hereinafter referred to as motor) with high accuracy.

BACKGROUND ART

Prior art documents disclose a method of driving a motor using a plurality of encoders.

For instance, Patent Document 1 discloses a technique of, using a plurality of encoders, properly determining an abnormal encoder even if a part of the plurality of encoders fails, and controlling an electric motor using outputs of normal encoders. However, Patent Document 1 fails to disclose a technique of using the encoders with the encoders switched during the operation with consideration given to a detection cycle and resolution (resolving power) of the encoder. Therefore, when controlling the motor, the encoder according to an operating range cannot be selected.

Patent Document 2 also discloses a technique of performing control using a plurality of encoders. In Patent Document 2, a motor controls a photosensitive drum, which is a load, through a speed reducer. Rotation speed of the motor itself and rotation speed of the load side are detected, then the load itself is controlled with high accuracy. In a case of vector control performed using phase information of the motor, when a phase is generated using encoder information of the load side, a deviation (a phase shift) from a phase of the motor itself occurs, then a torque error arises. This method can perform speed control of the load side with high accuracy, but cannot control torque of the motor itself with high accuracy.

In Patent Documents 1 and 2, switching of the encoder with consideration given to minimum resolution concerning an encoder detection phase is not performed.

The minimum resolution concerning the encoder detection phase is determined by a detection cycle of the encoder, encoder resolution and motor rotation speed. Since if a condition of this minimum resolution is not satisfied, the encoder detection phase is not updated, even though an actual motor rotates, a phase used for the control is not updated. For this reason, there arises a problem of causing a detection error and deteriorating control performance.

From the above, an object is, in the power conversion device, to properly use the encoder having high resolution and slow detection time and the encoder having low resolution and fast detection time according to the rotation speed and control the current and the rotation speed with high accuracy.

CITATION LIST

Patent Document

Patent Document 1: Japanese Unexamined Patent Application Publication No. H08-336299
Patent Document 2: Japanese Unexamined Patent Application Publication No. 2000-231305

SUMMARY OF THE INVENTION

The present invention was devised in view of the above conventional problems. As one aspect of the present invention, a power conversion device that drives a motor comprises: a first position/rotation detector; a second position/rotation detector whose resolution per rotation of the motor is higher than that of the first position/rotation detector but whose detection cycle is slower than that of the first position/rotation detector; and an encoder switching operation process unit configured to switch between a signal of the first position/rotation detector and a signal of the second position/rotation detector and output the signal of the first position/rotation detector or the signal of the second position/rotation detector, or adjust a ratio of the signal between the first position/rotation detector and the second position/rotation detector and output a signal obtained by adding adjusted signals.

As one aspect of the present invention, the encoder switching operation process unit is configured to compare a detection rotation speed and a threshold value, and output an encoder switching judgment signal that is turned when a reference signal becomes ON, generate an encoder switching permission signal by the encoder switching judgment signal, a detection cycle of the first position/rotation detector and a detection cycle of the second position/rotation detector, and switch between the signal of the first position/rotation detector and the signal of the second position/rotation detector according to the encoder switching permission signal.

As one aspect of the present invention, the encoder switching operation process unit is configured to provide the threshold value with hysteresis, when the encoder switching permission signal is turned from OFF to ON, set the threshold value to a value obtained by adding rotation speed detection accuracy to rotation speed minimum resolution of the second position/rotation detector according to the detection cycle of the second position/rotation detector, and when the encoder switching permission signal is turned from ON to OFF, set the threshold value to the rotation speed minimum resolution of the second position/rotation detector according to the detection cycle of the second position/rotation detector.

As another aspect of the present invention, the encoder switching operation process unit is configured to provide the threshold value with hysteresis, when the encoder switching permission signal is turned from OFF to ON, set the threshold value to rotation speed minimum resolution of the first position/rotation detector according to the detection cycle of the second position/rotation detector, and when the encoder switching permission signal is turned from ON to OFF, set the threshold value to rotation speed minimum resolution of the second position/rotation detector according to the detection cycle of the second position/rotation detector.

As one aspect of the present invention, the first position/rotation detector is configured to output an A-phase pulse, a B-phase pulse and a Z-phase pulse, the reference signal is a signal that occurs once per rotation, and a signal generated from a relationship between the Z-phase and the A-phase of the first position/rotation detector, a signal generated from a relationship between the Z-phase and the B-phase of the first position/rotation detector, or the Z-phase pulse itself, is used as the reference signal.

As one aspect of the present invention, when the encoder switching permission signal is ON, the signal of the first position/rotation detector is used, turning from OFF to ON of the encoder switching permission signal is done at the detection cycle of the first position/rotation detector, when the encoder switching permission signal is OFF, the signal of the second position/rotation detector is used, and turning from ON to OFF of the encoder switching permission signal is done at the detection cycle of the second position/rotation detector.

As another aspect of the present invention, an encoder switching permission signal is generated by an A-phase pulse and a B-phase pulse of the first position/rotation detector, a reference signal, a detection cycle of the first position/rotation detector and a detection cycle of the second position/rotation detector, and the signal of the first position/rotation detector and the signal of the second position/rotation detector are switched according to the encoder switching permission signal.

As one aspect of the present invention, the power conversion device further comprises: an A-phase first RS flip-flop circuit configured to latch for the phase detection cycle of the second position/rotation detector when a rising edge/falling edge of the A-phase pulse occurs; a B-phase first RS flip-flop circuit configured to latch for the phase detection cycle of the second position/rotation detector when a rising edge/falling edge of the B-phase pulse occurs; an A-phase up-counter configured to count, as an input, a logical product of an output of the A-phase first RS flip-flop circuit and the detection cycle of the second position/rotation detector and input, as a reset signal, a logical OR of a logical NOT of the output of the A-phase first RS flip-flop circuit and the rising edge/falling edge of the A-phase pulse; a B-phase up-counter configured to count, as an input, a logical product of an output of the B-phase first RS flip-flop circuit and the detection cycle of the second position/rotation detector and input, as a reset signal, a logical OR of a logical NOT of the output of the B-phase first RS flip-flop circuit and the rising edge/falling edge of the B-phase pulse; an A-phase comparator configured to output the reset signal to the A-phase first RS flip-flop circuit when a counter of the A-phase up-counter becomes 2; and a B-phase comparator configured to output the reset signal to the B-phase first RS flip-flop circuit when a counter of the B-phase up-counter becomes 2.

As another aspect of the present invention, the power conversion device further comprises: an A-phase first RS flip-flop circuit configured to latch for the phase detection cycle of the second position/rotation detector when a rising edge/falling edge of the A-phase pulse occurs; a B-phase first RS flip-flop circuit configured to latch for the phase detection cycle of the second position/rotation detector when a rising edge/falling edge of the B-phase pulse occurs; an A-phase up-counter configured to count, as an input, a logical product of an output of the A-phase first RS flip-flop circuit and the detection cycle of the first position/rotation detector and input, as a reset signal, a logical OR of a logical NOT of the output of the A-phase first RS flip-flop circuit and the rising edge/falling edge of the A-phase pulse; a B-phase up-counter configured to count, as an input, a logical product of an output of the B-phase first RS flip-flop circuit and the detection cycle of the first position/rotation detector and input, as a reset signal, a logical OR of a logical NOT of the output of the B-phase first RS flip-flop circuit and the rising edge/falling edge of the B-phase pulse; an A-phase comparator configured to output the reset signal to the A-phase first RS flip-flop circuit when a counter of the A-phase up-counter becomes an expression (5); and a B-phase comparator configured to output the reset signal to the B-phase first RS flip-flop circuit when a counter of the B-phase up-counter becomes an expression (5).

[Expression 5]

$$C = \frac{ABS \text{ detection cycle}}{INC \text{ detection cycle}} + 1 \qquad (5)$$

C: counter
ABS detection cycle: detection cycle of second position/rotation detector
INC detection cycle: detection cycle of first position/rotation detector As another aspect of the present invention, the first position/rotation detector is configured to output an A-phase pulse, a B-phase pulse and a Z-phase pulse, the Z-phase pulse is a signal that occurs once per rotation, a reference signal is a signal generated from a relationship between the Z-phase and the A-phase or a signal generated from a relationship between the Z-phase and the B-phase, an encoder switching permission signal is generated by a signal, which is not used for generating the reference signal, of either the A-phase pulse or the B-phase pulse, the reference signal, a detection cycle of the first position/rotation detector and a detection cycle of the second position/rotation detector, and the signal of the first position/rotation detector and the signal of the second position/rotation detector are switched according to the encoder switching permission signal.

As another aspect of the present invention, the encoder switching operation process unit is configured to calculate a weighting factor on the basis of a detection rotation speed detected by the first position/rotation detector or the second position/rotation detector, a detection cycle of the first position/rotation detector and a detection cycle of the second position/rotation detector, and adjust the ratio of the signal between the first position/rotation detector and the second position/rotation detector according to the weighting factor, and output the signal obtained by adding the adjusted signals.

As one aspect of the present invention, the encoder switching operation process unit is configured to determine the weighting factor according to a value of the detection rotation speed, set one, which is a lower value, of rotation speed minimum resolutions of the first and second position/rotation detectors according to the detection cycle of the second position/rotation detector to a minimum value, and set the other, which is a higher value, of the rotation speed minimum resolutions of the first and second position/rotation detectors to 1 of a maximum value.

As one aspect of the present invention, an output of an operation of the weighting factor is provided with a hysteresis range having a width of a rotation detector error.

As another aspect of the present invention, the encoder switching operation process unit is configured to determine the weighting factor according to the detection rotation speed, set one, which is a lower value, of rotation speed minimum resolutions of the first and second position/rotation detectors according to the detection cycle of the second position/rotation detector to a minimum value, set one, which is a higher value, of the rotation speed minimum resolutions of the first and second position/rotation detectors according to the detection cycle of the first position/rotation detector to 1 of a maximum value, compare the detection rotation speeds of the first and second position/rotation detectors, and set the weighting factor to 1 if a difference in the detection rotation speed between the first and second position/rotation detectors is within a detection error range.

According to the present invention, it is possible, in the power conversion device, to properly use the encoder having high resolution and slow detection time and the encoder having low resolution and fast detection time according to the rotation speed and control the current and the rotation speed with high accuracy.

EMBODIMENTS FOR CARRYING OUT THE INVENTION

A power conversion device according to the present invention will be described in detail with reference to FIGS. 1 to 30.

Figure 1:
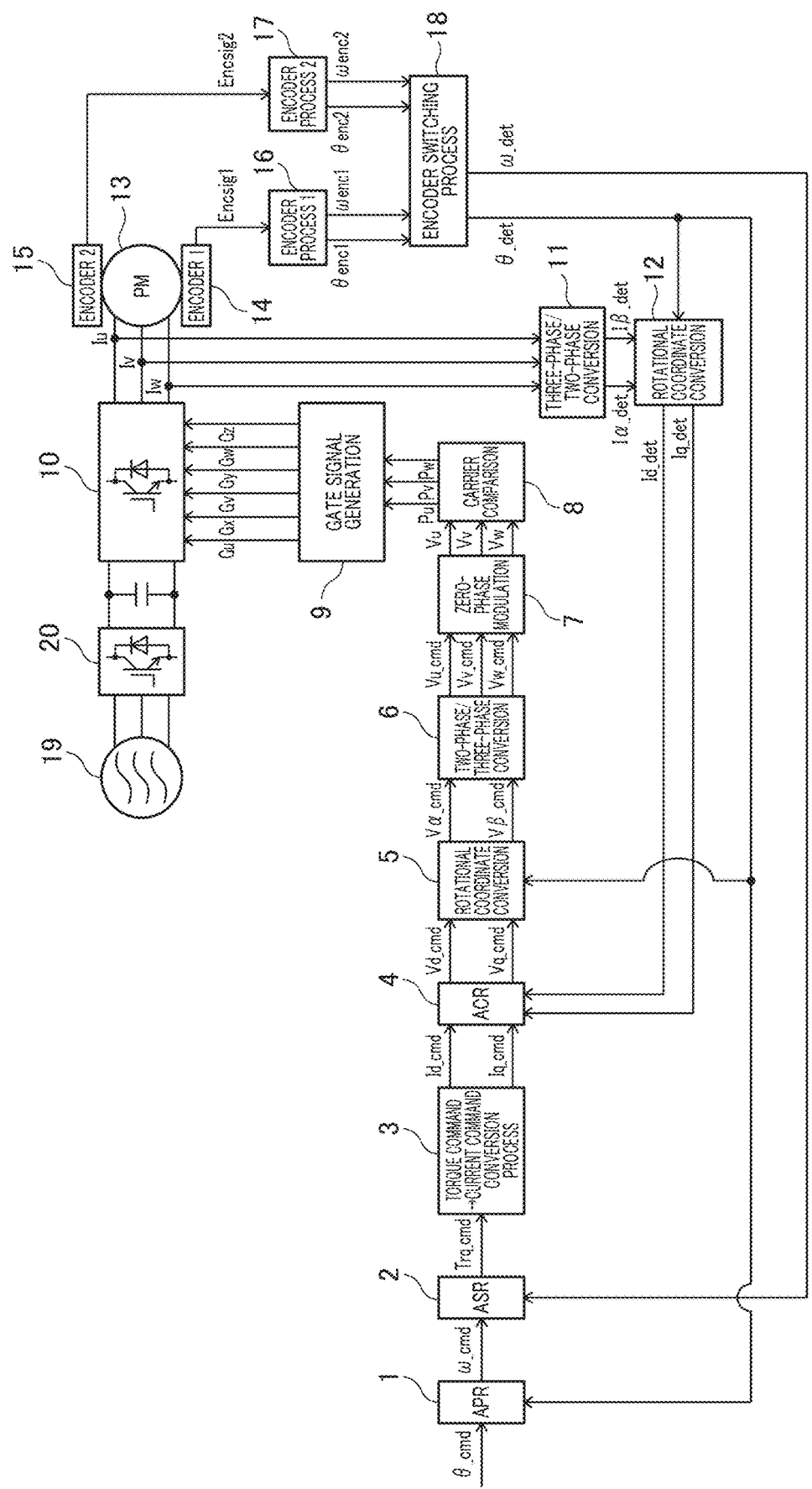
FIG. 1 is a block diagram showing an example of a configuration of a power conversion device.

FIG. 1 shows an example of the power conversion device of the present invention. A configuration in which position control (hereinafter referred to as APR) for controlling a position as a main purpose is performed is illustrated in FIG. 1. An APR 1 compares a phase command θ_cmd and a control phase θ_det, and outputs a rotation speed command ω_cmd so as to eliminate an error between the phase command θ_cmd and the control phase θ_det. Subsequently, an ASR 2 performs speed control (hereinafter referred to as ASR) so as to eliminate an error between the rotation speed command ω_cmd and a detection rotation speed ω_det by comparing these rotation speed command co cmd and detection rotation speed ω_det, and outputs a torque command Trq_cmd.

A command conversion process unit 3 performs a torque command→current command conversion process of the torque command Trq_cmd, then converts the torque command Trq_cmd into a d-axis current command Id cmd and a q-axis current command Iq_cmd.

An ASR 4 performs current control (hereinafter referred to as ACR) so as to eliminate an error between the d-axis current command Id cmd and a d-axis current detection Id det and eliminate an error between the q-axis current command Iq_cmd and a q-axis current detection Iq_det by comparing these d-axis current command Id cmd and d-axis current detection Id det and comparing these q-axis current command Iq_cmd and q-axis current detection Iq_det, and outputs a d-axis voltage command Vd_cmd and a q-axis voltage command Vq_cmd.

A rotational coordinate conversion unit 5 performs a coordinate conversion of the d-axis voltage command Vd_cmd and the q-axis voltage command Vq_cmd with the control phase θ_det, and outputs an α-axis voltage command Vα_cmd and a β-axis voltage command Vβ_cmd.

A two-phase/three-phase conversion unit 6 performs a two-phase/three-phase conversion of the α-axis voltage command Vα_cmd and the β-axis voltage command Vβ_cmd, and outputs a U-phase voltage command Vu cmd, a V-phase voltage command Vv_cmd and a W-phase voltage command Vw_cmd.

A zero-phase modulation unit 7 zero-phase-modulates the U-phase voltage command Vu cmd, the V-phase voltage command Vv_cmd and the W-phase voltage command Vw_cmd, and outputs a zero-phase-modulated U-phase voltage command Vu, a zero-phase-modulated V-phase voltage command Vv and a zero-phase-modulated W-phase voltage command Vw.

A carrier comparison unit 8 performs a carrier comparison of the zero-phase-modulated U-phase voltage command Vu, the zero-phase-modulated V-phase voltage command Vv and the zero-phase-modulated W-phase voltage command Vw, and outputs a U-phase PWM modulation command Pu, a V-phase PWM modulation command Pv and a W-phase PWM modulation command Pw.

A gate signal generation unit 9 generates, on the basis of the U-phase PWM modulation command Pu, the V-phase PWM modulation command Pv and the W-phase PWM modulation command Pw, a U-phase upper arm gate signal Gu, a U-phase lower arm gate signal Gx, a V-phase upper arm gate signal Gv, a V-phase lower arm gate signal Gy, a W-phase upper arm gate signal Gw and a W-phase lower arm gate signal Gz, and drives an inverter 10. In FIG. 1, a reference sign 19 denotes a three-phase AC power supply, and a reference sign 20 denotes a converter.

A three-phase/two-phase conversion unit 11 performs a three-phase/two-phase conversion of an inverter U-phase output current Iu, an inverter V-phase output current Iv and an inverter W-phase output current Iw, and outputs an α-axis current detection Iα_det and a β-axis current detection Iβ_det.

A rotational coordinate conversion unit 12 performs a coordinate conversion of the α-axis current detection Iα_det and the β-axis current detection Iβ_det with the control phase θ_det, and outputs the d-axis current detection Id det and the q-axis current detection Iq_det.

Since the d-axis current detection Id det and the q-axis current detection Iq_det, which are obtained by the coordinate conversion, are used in the ASR 4, when intending to control a permanent magnet synchronous motor (hereinafter referred to as PM) 13 with high accuracy, detection accuracy is required. Therefore, the control phase θ_det is an extremely important signal.

The control phase θ_det can be obtained by encoders. In FIG. 1, a first encoder (a first phase/rotation detector) 14 and a second encoder (a second phase/rotation detector) 15 output a first encoder signal Encsig1 and a second encoder signal Encsig2 respectively. A first encoder process unit 16 and a second encoder process unit 17 determine, on the basis of the first encoder signal Encsig1 and the second encoder signal Encsig2, a first encoder detection phase θenc1/a first encoder detection rotation speed ωenc1 (a signal of the first position/rotation detector) and a second encoder detection phase θenc2/a second encoder detection rotation speed ωenc2 (a signal of the second position/rotation detector) respectively.

An encoder switching operation process unit 18 selects which signal of the first encoder detection phase θenc1/the first encoder detection rotation speed ωenc1 determined and the second encoder detection phase θenc2/the second encoder detection rotation speed ωenc2 determined is used, or performs a weight operation according to the rotation speed (frequency), then outputs it as the control phase θ_det/the detection rotation speed ω_det.

As the first encoder 14, an incremental encoder (hereinafter referred to as INC) is employed. This encoder has an output signal of pulse. As characteristics, resolution (resolving power) is low, but there is less delay in an output pulse.

As the second encoder 15, such an encoder that the resolution (the resolving power) is high, but there is a detection delay is employed. In the power conversion device in FIG. 1, it is a high-resolution encoder, although this encoder cannot perform detection at a cycle faster than a rotational coordinate conversion process cycle. For instance, it is a serial signal output type absolute encoder (hereinafter referred to as ABS). A format of signal is a serial signal, and there is a transmission delay. However, since this encoder has resolution of as many as several tens of bits per rotation (revolution), this encoder has characteristics of extremely high resolution. Here, there is no problem even if the first encoder 14 and the second encoder 15 are interchanged with each other.

FIG. 1 illustrates that as control in which a phase is detected from information of the encoder and used it, vector control is an object of the control. However, the control can also be applied to other control configuration as long as a phase is detected from information of the encoder and used it in the configuration. Further, the control could be performed with rotation speed or current being a main purpose.

Figure 2:
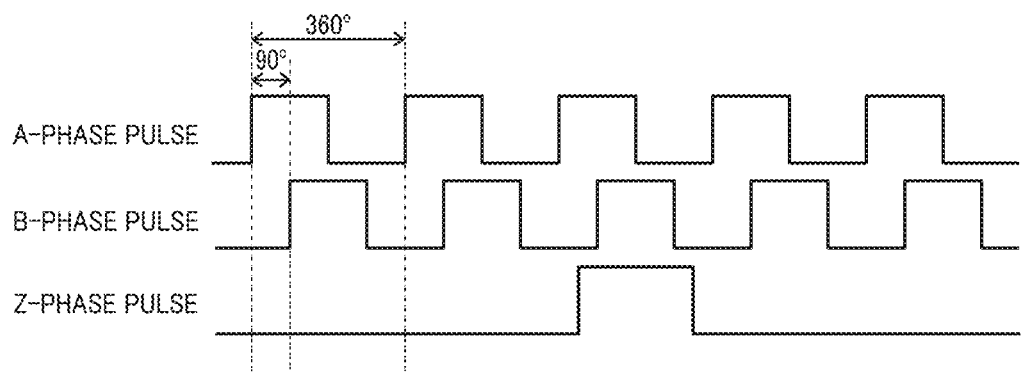
FIG. 2 is a drawing showing an example of an A-phase pulse, a B-phase pulse and a Z-phase pulse which are output pulses of an INC.

FIG. 2 illustrates an example of the output pulse of the INC. There are three types of signals, and an A-phase pulse and a B-phase pulse are output several hundreds of pulses per rotation (revolution). A Z-phase pulse is a pulse that is output once per rotation (revolution). The A-phase pulse and the B-phase pulse are signals with a phase difference of 90°. Here, 360° is a pulse one cycle. FIG. 2 is an example, and there are various forms such as FIGS. 3 and 4 depending on a signal specification of the encoder.

Figure 5:
FIG. 5 is a drawing showing an example of an output signal of an ABS.

FIG. 5 illustrates an output of the ABS. Time required for transmission varies depending on a transmission speed per bit and a signal length.

Figure 6:
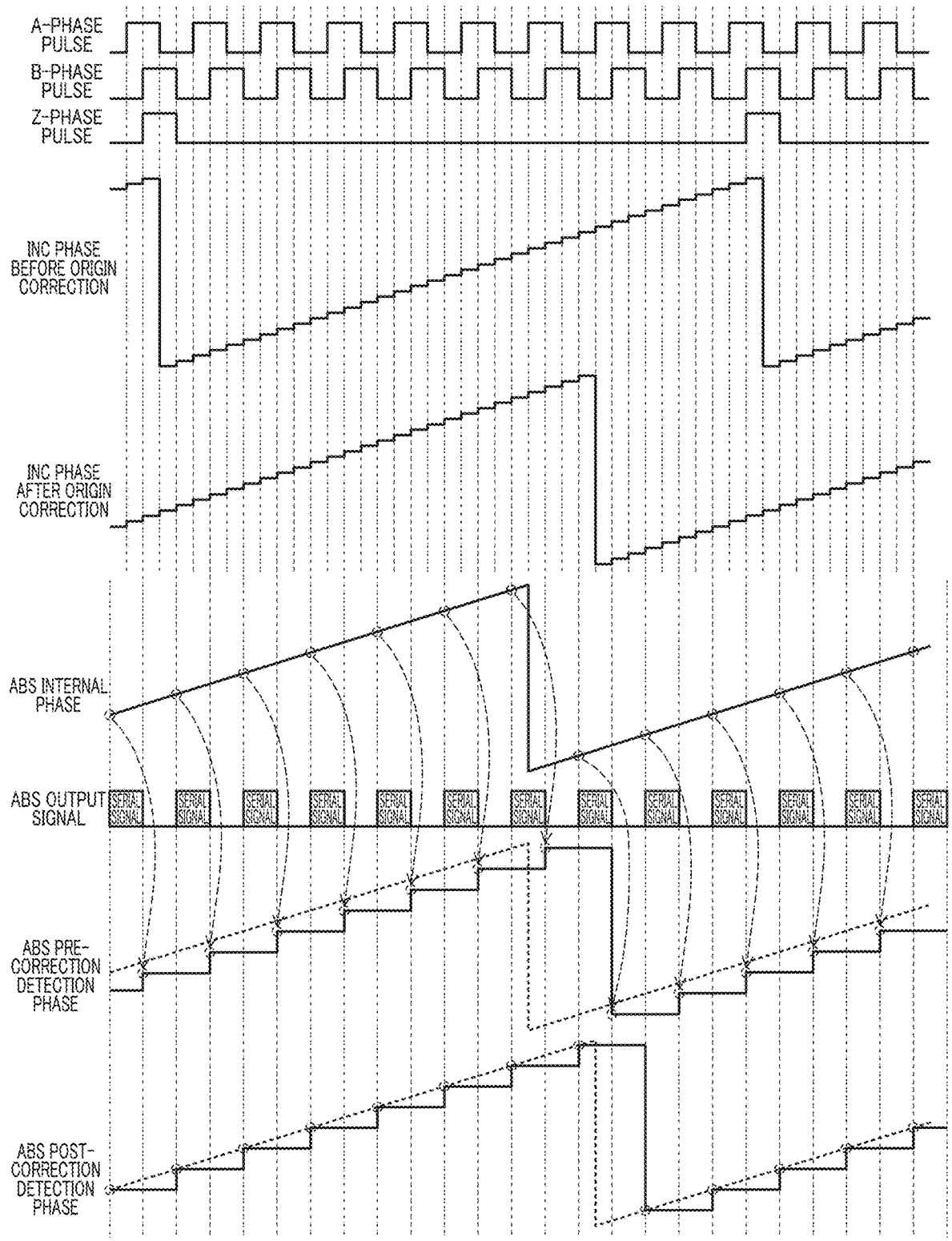
FIG. 6 is a drawing showing a relationship between the output signal and a detection phase of the INC and the ABS.

FIG. 6 illustrates a relationship between the output signal and the detection phase of the INC and the ABS. The detection phase of the INC is detected by and at a rising edge and a falling edge of the A-phase pulse and a rising edge and a falling edge of the B-phase pulse (hereinafter referred to as 4f mode). While the Z-phase pulse is rising, the phase is reset at a timing of fall of the A-phase pulse. In a case of reverse rotation, while the Z-phase pulse is rising, the phase is reset at a timing of rise of the A-phase pulse. This is a phase before origin correction.

In a case where the motor driven by the inverter is the PM, it is required to adjust an encoder origin position so that when a magnet of a rotor is in a state of no phase difference from a U-phase winding of a stator, the detection phase is 0. In the case of the INC, a deviation (a shift) between the detection phase of the Z-phase pulse and a magnet position is corrected. In the case of the ABS, a deviation (a shift) between a zero-point of an encoder output detection phase and a magnet position is corrected. A phase after this correction is a phase after origin correction (an origin-corrected phase).

As the detection phase of the ABS, an ABS internal detection phase is sent by serial transmission. Because of the serial transmission, a transmission delay occurs. This serial-transmitted phase is origin-corrected. A phase obtained by compensating for the serial transmission delay with respect to the origin-corrected value becomes an ABS corrected detection phase (an ABS post-correction detection phase).

These corrected phases are switched by an encoder switching process at the encoder switching operation process unit 18. Alternatively, a weight operation process is performed to change a ratio (or a proportion) (weight) of an encoder detection value for each rotation speed. In FIG. 1, when the Z-phase pulse is detected under a certain rotation speed condition, the encoder switching process or the weight operation process is performed.

Figure 7:
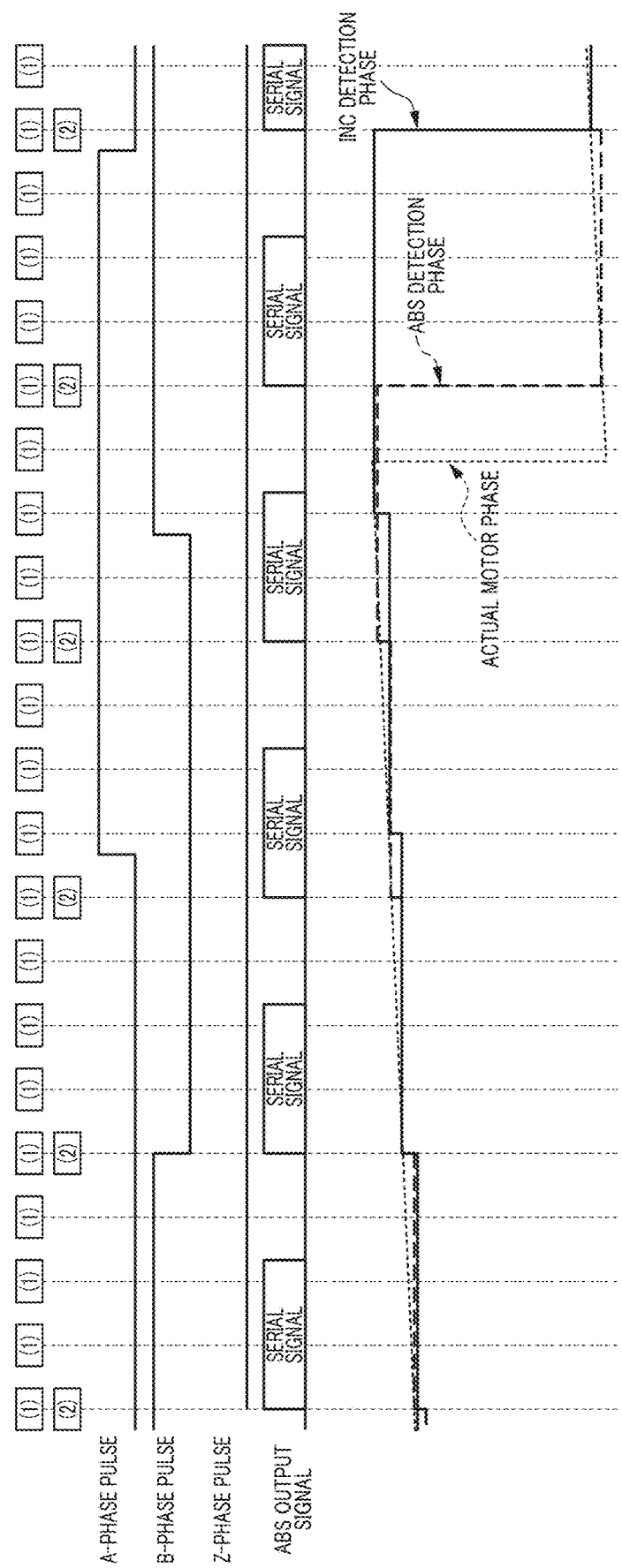
FIG. 7 is a drawing showing detection waveforms of the INC and the ABS at a low speed with consideration given to a detection cycle.

FIG. 7 illustrates detection waveforms of the INC and the ABS at a low speed with consideration given to a detection cycle. (1) in FIG. 7 is an INC detection cycle, and (2) in FIG. 7 is an ABS detection cycle. As mentioned above, because of the serial transmission, the ABS has the transmission delay. Since detection cannot be performed faster than a transmission time, the detection cycle is restricted by the transmission time. In the case of the INC, there is no restriction on the detection cycle because the method is to detect the pulse in sequence. At the low speed, since the pulse of the INC is not input between the ABS detection cycles, update of the INC detection phase is slower (later) than the ABS detection phase, and thus resolution is low. On the other hand, the ABS detection phase is periodically updated, and thus it can be understood that resolution is higher than that of the INC.

Figure 8:
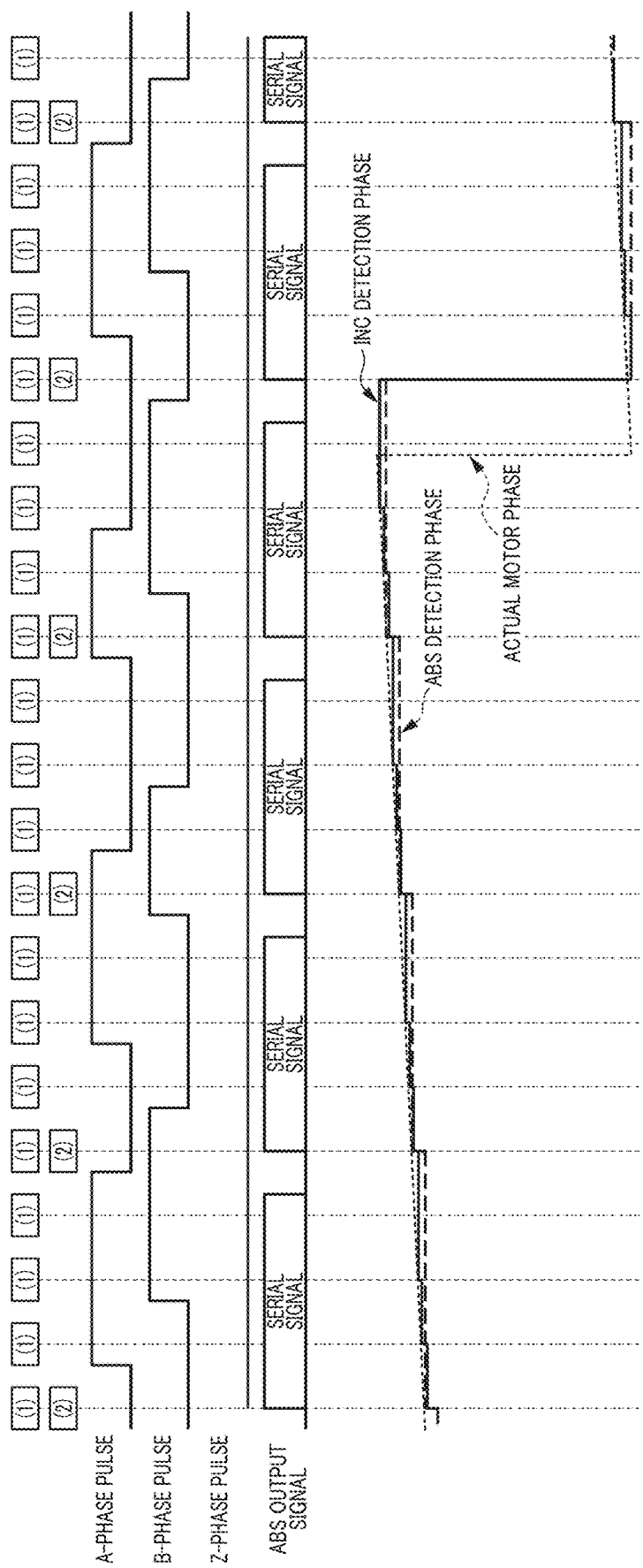
FIG. 8 is a drawing showing detection waveforms of the INC and the ABS at a high speed with consideration given to a detection cycle.

Next, FIG. 8 illustrates detection waveforms of the INC and the ABS at a high speed with consideration given to the detection cycle. (1) in FIG. 8 is the INC detection cycle, and (2) in FIG. 8 is the ABS detection cycle. At the high speed, since the pulse of the INC is input between the ABS detection cycles, update of the INC detection phase is faster (earlier) than the ABS detection phase, and thus resolution is high. On the other hand, although the ABS detection phase is periodically updated, since update of the ABS detection phase is slower (later) than the INC detection phase, resolution is low.

Embodiment 1

Figure 9:
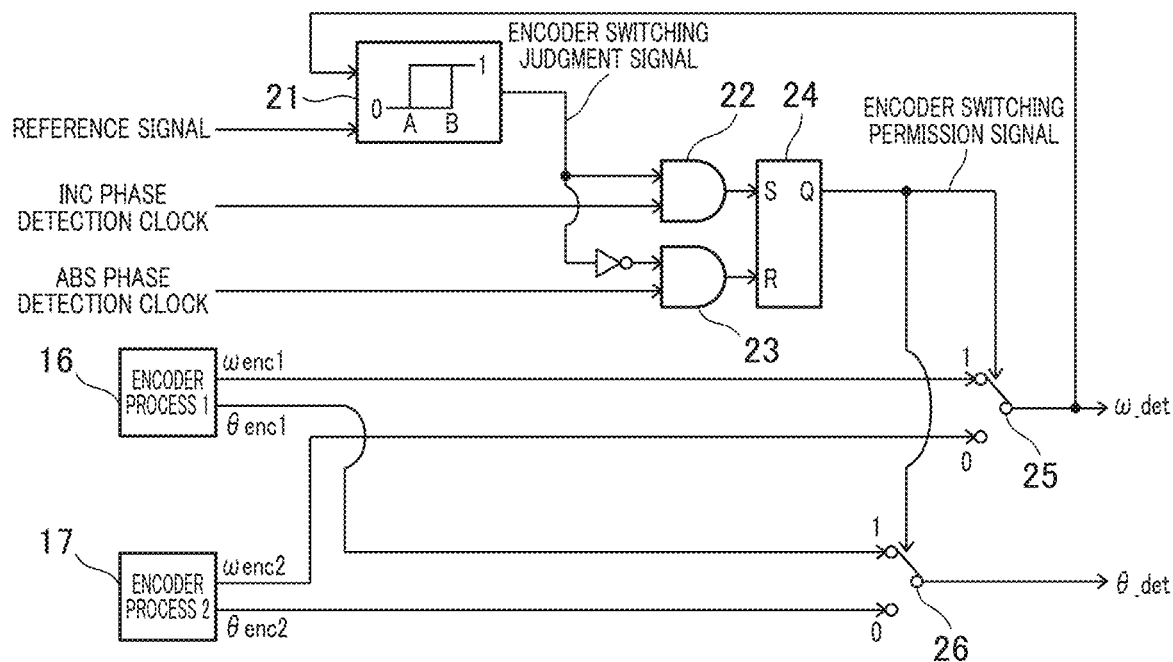
FIG. 9 is a block diagram showing an encoder switching operation process unit according to an embodiment 1.

FIG. 9 illustrates a block diagram of the encoder switching operation process unit 18 according to an embodiment 1. In the present embodiment 1, the detection rotation speed ω_det is used for encoder switching judgment. A threshold comparison unit 21 compares the detection rotation speed ω_det and a threshold value, and outputs an encoder switching judgment signal that is switched (turned) when a reference signal becomes ON. Further, the threshold comparison unit 21 sets hysteresis to the threshold value in order to prevent unstable encoder switching which occurs due to rapid switching between 0 and 1 upon occurrence of oscillation of the detection rotation speed ω_det and/or occurrence of an error of rotation speed detection accuracy.

An AND element 22 outputs a logical product (an AND) of the encoder switching judgment signal of the output of the threshold comparison unit 21 and an INC phase detection clock (the detection cycle of the first position/rotation detector). An AND element 23 outputs a logical product (an AND) of a logical NOT of the encoder switching judgment signal and an ABS phase detection clock (the detection cycle of the second position/rotation detector).

An RS flip-flop circuit 24 inputs the output of the AND element 22 as a set signal, also inputs the output of the AND element 23 as a reset signal. An output of this RS flip-flop circuit 24 becomes an encoder switching permission signal.

A switch 25 outputs the first encoder detection rotation speed ωenc1 when the encoder switching permission signal is 1, and outputs the second encoder detection rotation speed ωenc2 when the encoder switching permission signal is 0. An output of the switch 25 becomes the detection rotation speed ω_det. A switch 26 outputs the first encoder detection phase θenc1 when the encoder switching permission signal is 1, and outputs the second encoder detection phase θenc2 when the encoder switching permission signal is 0. An output of the switch 26 becomes the control phase θ_det. That is, when the encoder switching permission signal is 1, the INC is selected, and when the encoder switching permission signal is 0, the ABS is selected. Here, since an absolute position cannot be recognized by the INC at startup, the phase and rotation speed information of the ABS are used. Because of this, the output for the encoder switching judgment at startup is 0.

Figure 10:
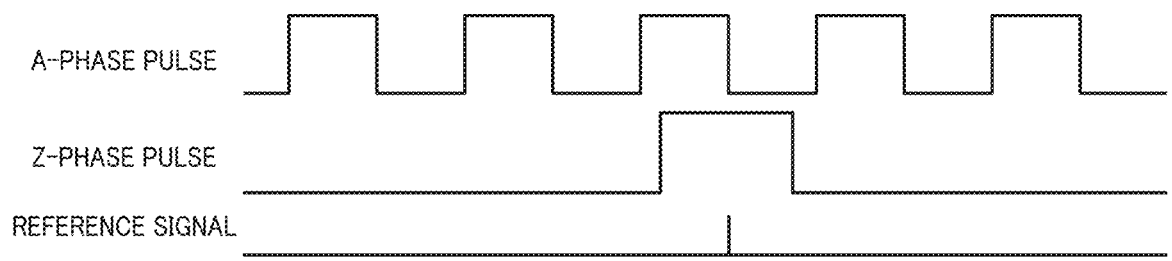
FIG. 10 is a drawing showing a relationship between a reference signal, the A-phase pulse and the Z-phase pulse.

The reference signal in the block diagram is defined as follows. In a case of a signal specification of FIG. 2, in a state in which the Z-phase pulse rises, a reference point is set at a time when the A-phase pulse falls or the A-phase pulse rises. When this reference point comes, the reference signal is output. Since the Z-phase pulse is one pulse per rotation, the reference signal also occurs only once per rotation. FIG. 10 illustrates a relationship between the reference signal, the A-phase pulse and the Z-phase pulse. As shown in FIG. 10, the reference signal is generated from the relationship between the Z-phase and the A-phase. In a case of a signal specification of FIG. 3, the reference signal is generated from a relationship between the Z-phase and the B-phase. In a case of a signal specification of FIG. 4, the Z-phase pulse itself is used as the reference signal. The reference signal is generated according to these signal forms.

Figure 3:
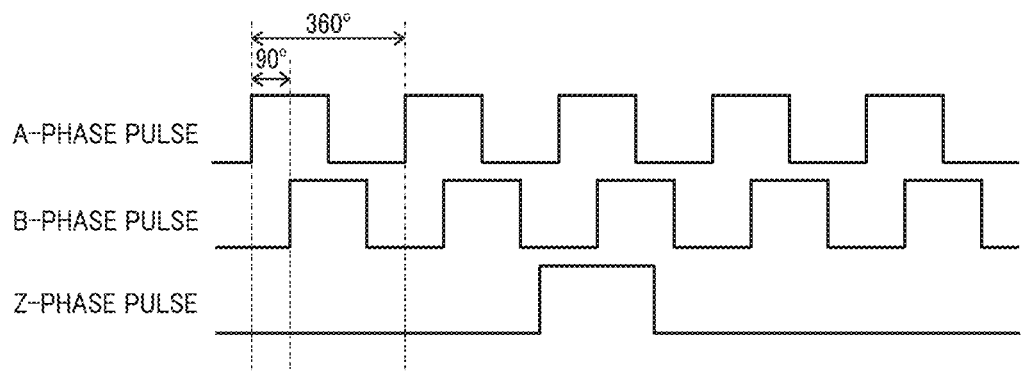
FIG. 3 is a drawing showing the other example of the A-phase pulse, the B-phase pulse and the Z-phase pulse which are the output pulses of the INC.
Figure 4:
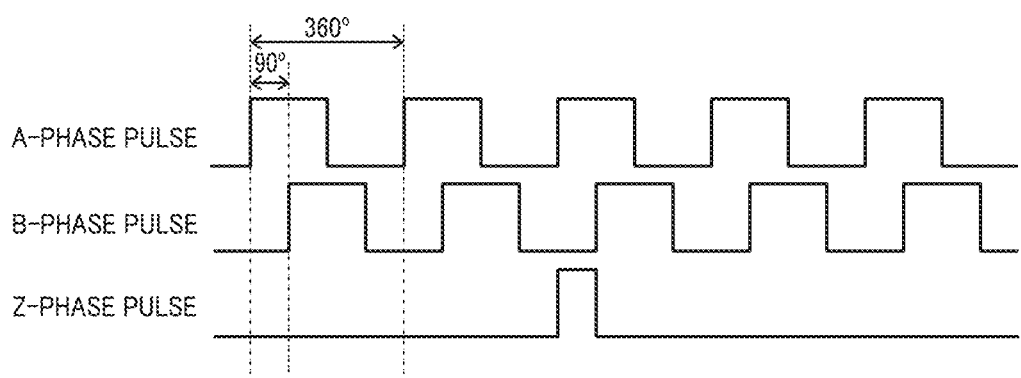
FIG. 4 is a drawing showing the other example of the A-phase pulse, the B-phase pulse and the Z-phase pulse which are the output pulses of the INC.

Operation will be described with the signal specification of FIG. 2 taken as an example. In the cases of FIGS. 3 and 4, the present method is applied according to their signal specifications. Therefore, the present method can be applied to FIGS. 3 and 4.

The encoder switching operation process unit 18 sets the threshold value of the rotation speed for performing switch of the encoder switching permission signal according to the detection cycle of the ABS (the second position/rotation detector) by rotation speed minimum resolution of each of the INC (the first position/rotation detector) and the ABS (the second position/rotation detector).

Assuming that the ABS is used when the rotation speed is low and the INC is used when the rotation speed is high, the minimum resolution for detection time of each encoder is an expression (1) and an expression (2).

[Expression 1]

$$ABS \text{ rotation speed minimum resolution} = \frac{60}{ABS \text{ resolution} \times \text{detection cycle}} [\text{min}^{-1}] \quad (1)$$

[Expression 2]

$$INC \text{ rotation speed minimum resolution} = \frac{60}{(\text{the number of pulses} \times 4) \times \text{detection cycle}} [\text{min}^{-1}] \quad (2)$$

Here, it is assumed that the detection cycle of the ABS is slower than that of the INC, and when the detection cycle of the expression (1) and the expression (2) is replaced with the ABS detection cycle, an expression (3) and an expression (4) are obtained.

[Expression 3]

$$ABS \text{ rotation speed minimum resolution for } ABS \text{ detection cycle} = \frac{60}{ABS \text{ resolution} \times ABS \text{ detection cycle}} [\text{min}^{-1}] \quad (3)$$

[Expression 4]

$$\text{INC rotation speed minimum resolution for ABS detection cycle} = \frac{60}{(\text{the number of pulses} \times 4) \times \text{ABS detection cycle}} [\text{min}^{-1}] \quad (4)$$

When the rotation speed is the rotation speed of the expression (3) or more, the ABS detection phase is updated at each ABS detection cycle. When the rotation speed is the rotation speed of the expression (4) or more, the INC detection phase is updated always at the ABS detection cycle.

When the rotation speed is this rotation speed of the expression (4) or more, update of the INC detection phase is faster (earlier) than that of the ABS detection phase. Therefore, resolution of the INC detection phase becomes higher than that of the ABS detection phase.

Here, the hysteresis of the threshold value for the encoder switching judgment is set to the following A and B.
A: rotation speed of the expression (4)
B: rotation speed of the expression (4)+rotation speed detection accuracy A condition of the rotation speed for the encoder switching is the following.
1. When the detection rotation speed is 0 to (the rotation speed of the expression (4)+rotation speed detection accuracy) or less, the ABS is used.
2. After the detection rotation speed exceeds (the rotation speed of the expression (4)+rotation speed detection accuracy) and the reference signal becomes ON, the INC is used.
3. After the detection rotation speed exceeds (the rotation speed of the expression (4)+rotation speed detection accuracy), until the detection rotation speed becomes less than the rotation speed of the expression (4) and the reference signal becomes ON, the INC is used.
4. When the detection rotation speed is the rotation speed of the expression (4) or less and the reference signal becomes ON, the ABS is used.
5. After 4., the ABS is used.

The encoder switching operation process unit 18 provides the threshold value with the hysteresis, and could set the threshold value to the rotation speed minimum resolution of the INC (the first position/rotation detector) according to the ABS detection cycle when the encoder switching permission signal is turned from OFF to ON, and could set the threshold value to the rotation speed minimum resolution of the ABS (the second position/rotation detector) according to the ABS detection cycle when the encoder switching permission signal is turned from ON to OFF.

Figure 11:
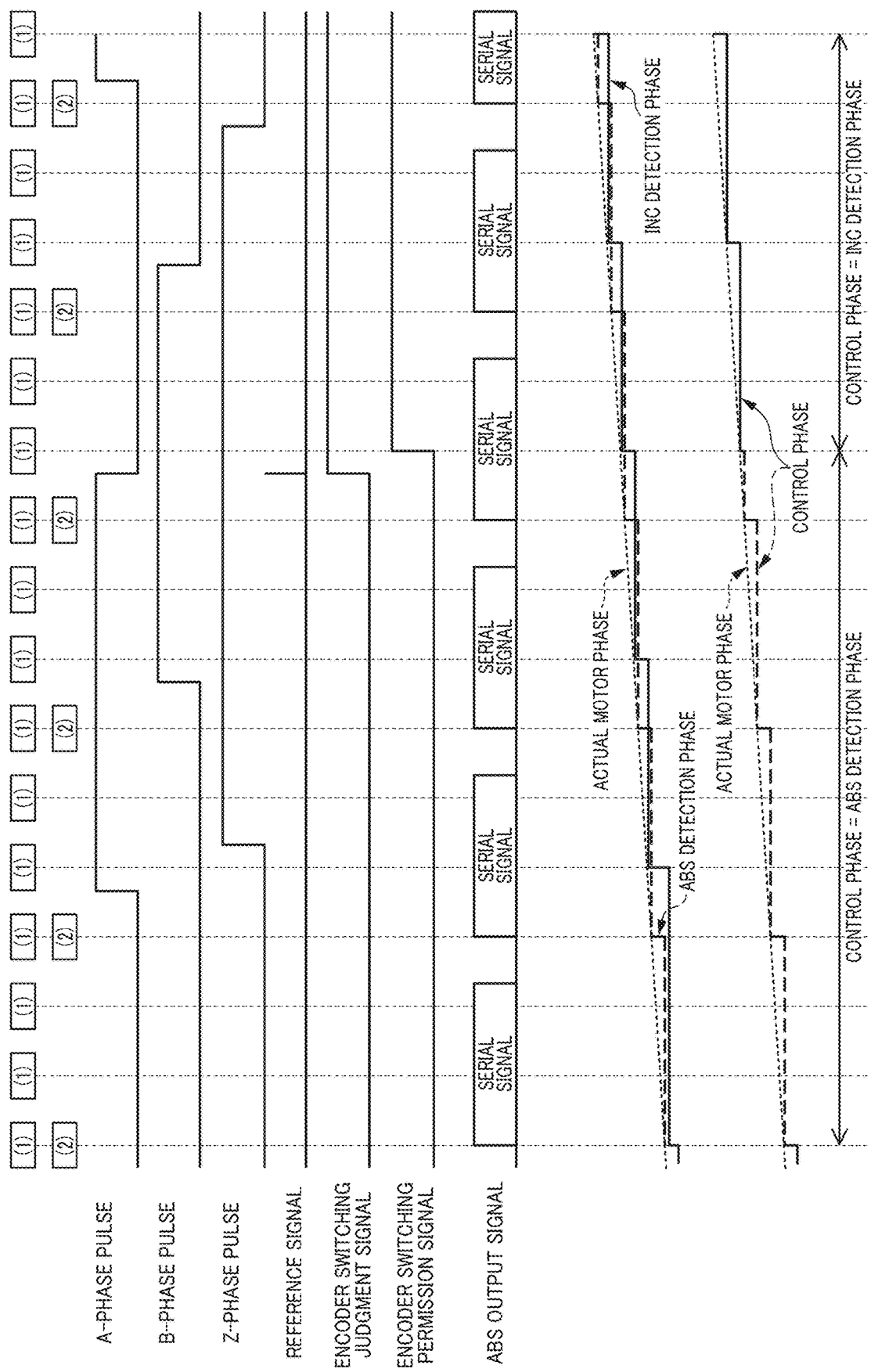
FIG. 11 is a drawing showing encoder phases at a time of switching of ABS→INC according to the embodiment 1.
Figure 12:
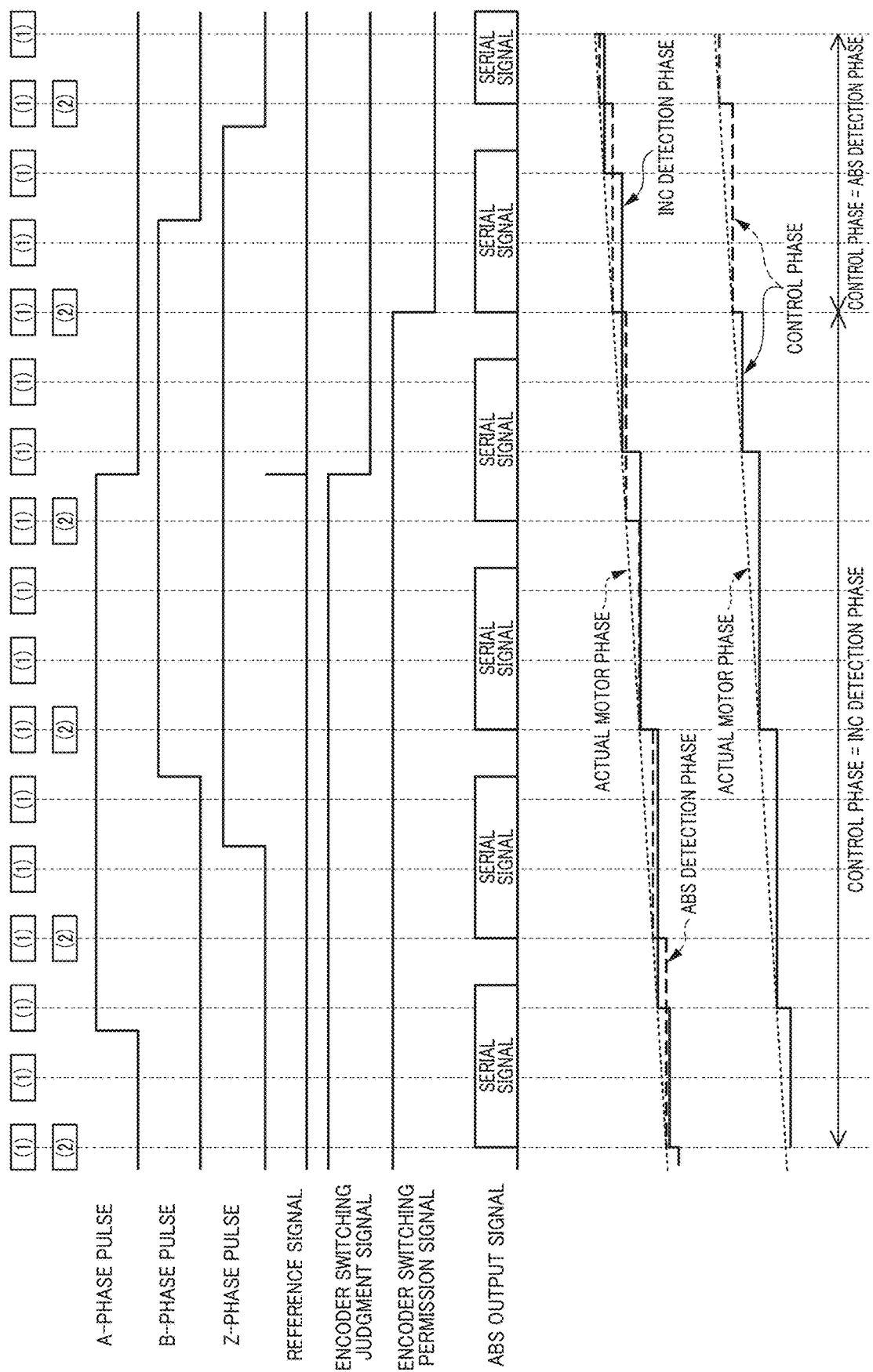
FIG. 12 is a drawing showing encoder phases at a time of switching of INC→ABS according to the embodiment 1.

FIGS. 11 and 12 illustrate the encoder phase at a time of the switching according to the embodiment 1. (1) is an INC detection cycle, and (2) is an ABS detection cycle. As shown in FIG. 11, it can be seen that the INC detection phase is updated within the ABS detection cycle and also the reference signal occurs, then the control phase is switched to the INC phase. Further, as shown in FIG. 12, it can be seen that the INC detection phase is not updated within the ABS detection cycle and also the reference signal occurs, then the control phase is switched to the ABS phase.

As depicted in FIGS. 11 and 12, when the encoder switching permission signal is ON, the INC (the first position/rotation detector) is used, and when the encoder switching permission signal is OFF, the ABS (the second position/rotation detector) is used. The switching (turning) from OFF to ON of the encoder switching permission signal is done at the detection cycle of the INC (the first position/rotation detector), and the switching (turning) from ON to OFF of the encoder switching permission signal is done at the detection cycle of the ABS (the second position/rotation detector).

By performing the switching in this manner, it can be seen that the encoder detection phase can be switched while the control phase is capturing an actual motor phase.

According to the present embodiment 1, the plurality of position/rotation detectors (the plurality of encoders) are used, and an optimum encoder is selected according to the operating condition, then the current and the rotation speed of the motor can be controlled with high accuracy.

Embodiment 2

Figure 13:
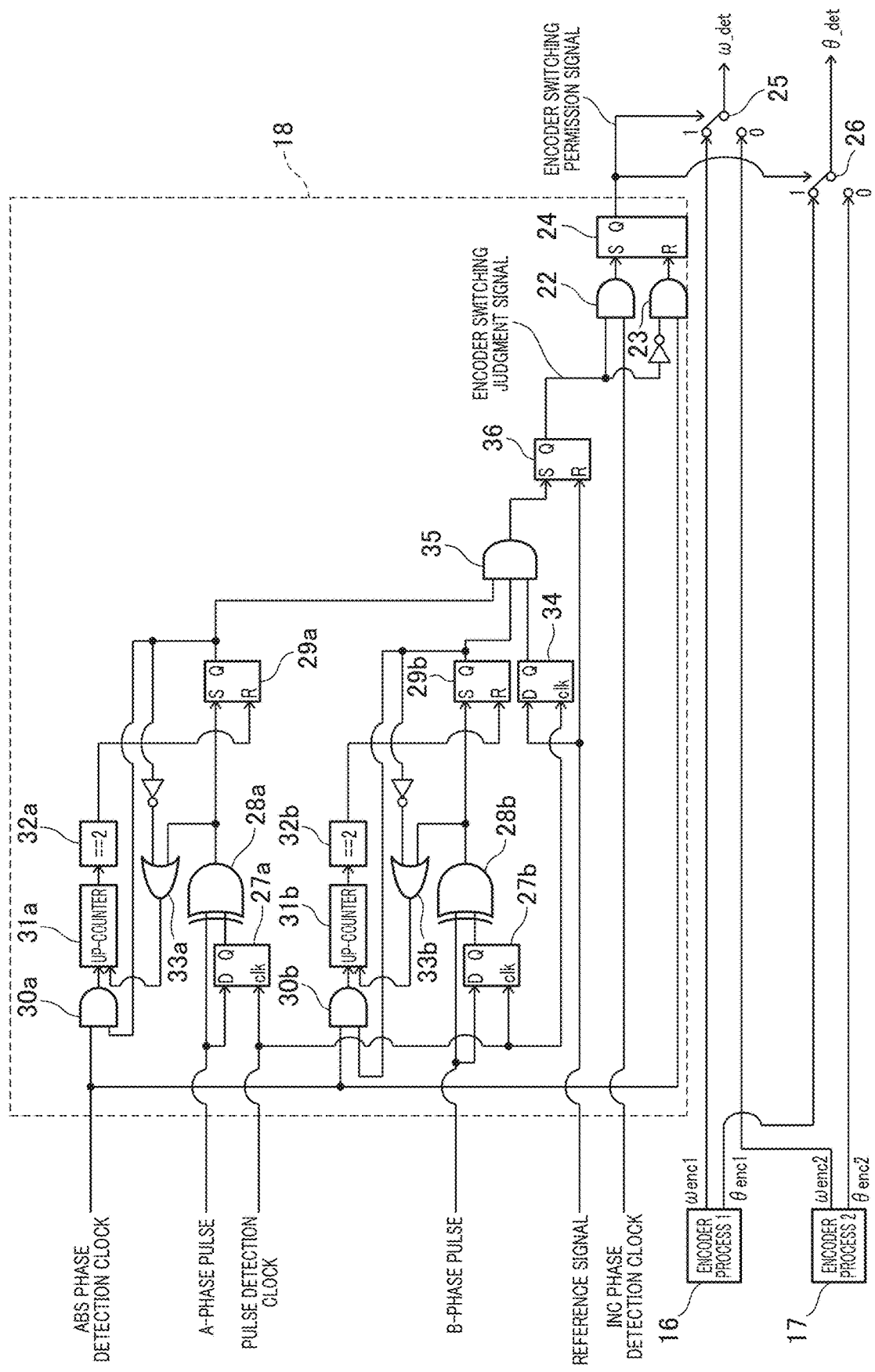
FIG. 13 is a block diagram showing an encoder switching operation process unit according to an embodiment 2.

In an embodiment 2, the encoder phase is switched by detecting an update cycle of the phase without using information of the speed detection (the detection rotation speed $\omega\_det$). FIG. 13 illustrates a block diagram of the encoder switching operation process unit 18 according to the embodiment 2. A pulse detection clock in FIG. 13 is a cycle signal for detecting the pulse of the INC. An ABS phase detection clock is an ABS phase detection cycle signal. A-phase pulse and B-phase pulse are signals of the INC.

An encoder switching permission signal is generated by the A-phase pulse and the B-phase pulse of the INC (the first position/rotation detector), the reference signal, the INC phase detection clock (the detection cycle of the first position/rotation detector) and the ABS phase detection clock (the detection cycle of the second position/rotation detector). The output signal of the INC (the first position/rotation detector) and the output signal of the ABS (the second position/rotation detector) are switched according to the encoder switching permission signal.

A D-type flip-flop 27a inputs the A-phase pulse and the pulse detection clock, and outputs a last value of the A-phase pulse. An exclusive-OR element 28a detects a rising edge and a falling edge of the A-phase pulse by taking an exclusive OR of a current value and the last value of the A-phase pulse.

This rising edge/falling edge of the A-phase pulse is input as a set signal of a first RS flip-flop circuit 29a. The first RS flip-flop circuit 29a latches an output for a phase detection period of the ABS when inputting the rising edge/falling edge of the A-phase pulse. The output of the first RS flip-flop circuit 29a becomes an encoder switching process A-phase pulse detection (an A-phase pulse detection for the encoder switching process).

An AND element 30a outputs a logical product (an AND) of the encoder switching process A-phase pulse detection and the ABS phase detection clock. An up-counter 31a for the A-phase pulse detection inputs and counts the output of the AND element 30a. A comparator 32a outputs a reset signal to the first RS flip-flop circuit 29a when a counter value becomes 2. An OR element 33a outputs a logical OR of a logical NOT of the first RS flip-flop circuit 29a and the exclusive-OR element 28a. The up-counter 31a inputs the output of the OR element 33a, and is always reset when the output of the first RS flip-flop circuit 29a is 0 or when the rising edge/falling edge of the A-phase pulse is detected. The B-phase is also processed in the same manner.

A D-type flip-flop circuit 34 inputs the reference signal and the pulse detection clock, and outputs an encoder switching process reference signal (a reference signal for the encoder switching process). An AND element 35 outputs a logical product (an AND) of the encoder switching process A-phase pulse detection, an encoder switching process B-phase pulse detection (a B-phase pulse detection for the encoder switching process) and the encoder switching process reference signal.

A second RS flip-flop circuit 36 inputs the output of the AND element 35 as a set signal and inputs the reference signal as a reset signal. An output of the second RS flip-flop circuit 36 becomes an encoder switching judgment signal. A state of this encoder switching judgment signal is held between the reference signals.

An AND element 22 outputs a logical product (an AND) of the encoder switching judgment signal and the INC phase detection clock to a third RS flip-flop circuit 24 as a set signal. An AND element 23 outputs a logical product (an AND) of a logical NOT of the encoder switching judgment signal and the ABS phase detection clock to the third RS flip-flop circuit 24 as a reset signal. An output of this third RS flip-flop circuit 24 becomes the encoder switching permission signal. When the encoder switching permission signal is 1, the INC is selected, and when the encoder switching permission signal is 0, the ABS is selected.

In the encoder switching process, in order to detect that the detection signal of the INC is updated earlier than the ABS phase detection cycle, the encoder switching process A-phase pulse detection and the encoder switching process B-phase pulse detection are first performed.

Figure 14:
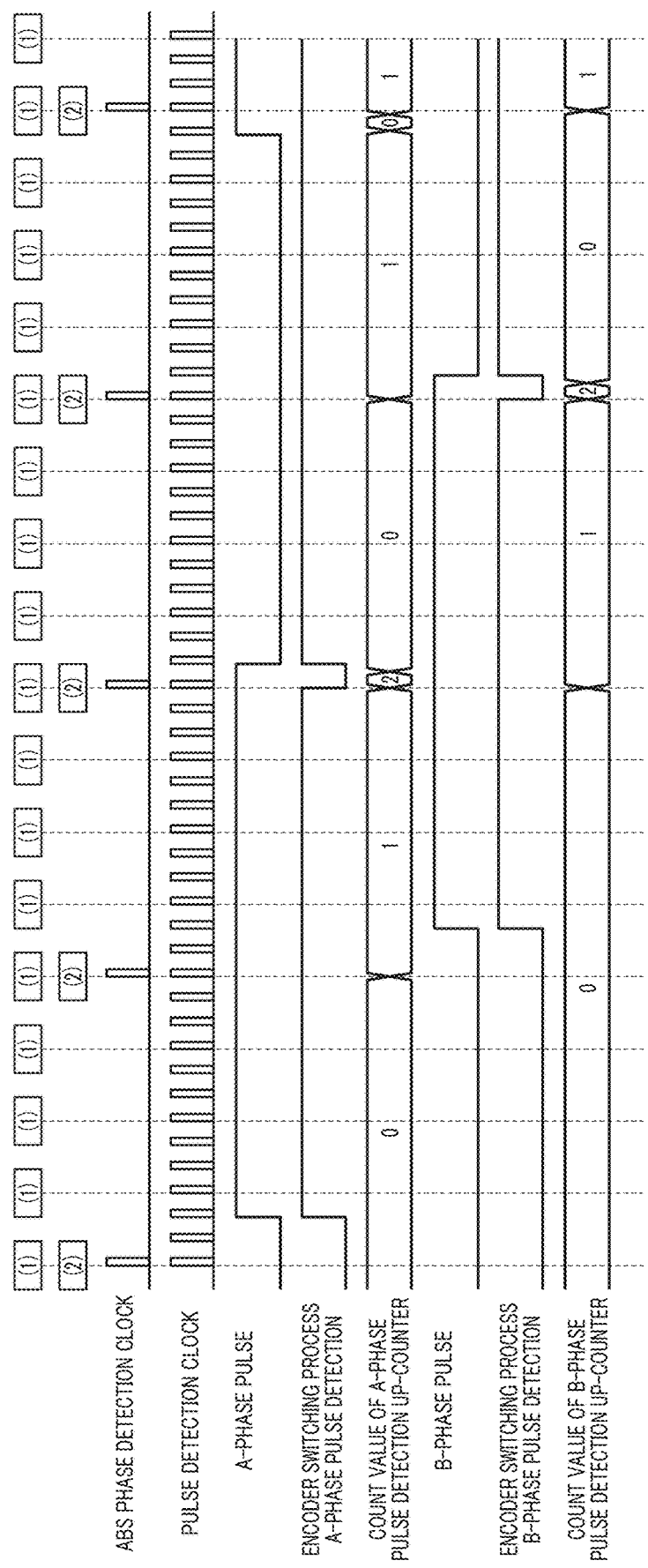
FIG. 14 is a timing chart showing an encoder switching process A-phase pulse detection and an encoder switching process B-phase pulse detection according to the embodiment 2.

FIG. 14 illustrates a timing chart of the encoder switching process A-phase pulse detection and the encoder switching process B-phase pulse detection. The encoder switching process A-phase pulse detection is set to 1 when detecting the rising edge/falling edge of the A-phase pulse detected at each pulse detection clock. Afterwards, the count value of the A-phase pulse detection up-counter increases by one at each ABS phase detection clock. When the count value becomes 2, the encoder switching process A-phase pulse detection is cleared. Also as can be seen from the timing chart, in a case where the count value is 2, the A-phase pulse does not change between the ABS phase detection clocks. This indicates that update of the INC detection phase becomes later than that of the ABS detection phase, and resolution of the INC detection phase is lower than that of the ABS detection phase.

Therefore, by performing this reset process, the signal of the encoder switching process A-phase pulse detection is cleared. When detecting the rising edge/falling edge of the A-phase pulse again, the encoder switching process A-phase pulse detection becomes 1. Although the count value of the A-phase pulse detection up-counter increases by one at each ABS phase detection clock, when detecting the rising edge/falling edge of the A-phase pulse before the count value becomes 2, the value of the up-counter is cleared and becomes 0. By clearing the count value by or at the detection of the rising edge/falling edge of the A-phase pulse, if the update of the INC detection phase is faster (earlier) than that of the ABS detection phase, the encoder switching process A-phase pulse detection is made not to be cleared.

The encoder switching process B-phase pulse detection is also operated in the same manner.

Figure 15:
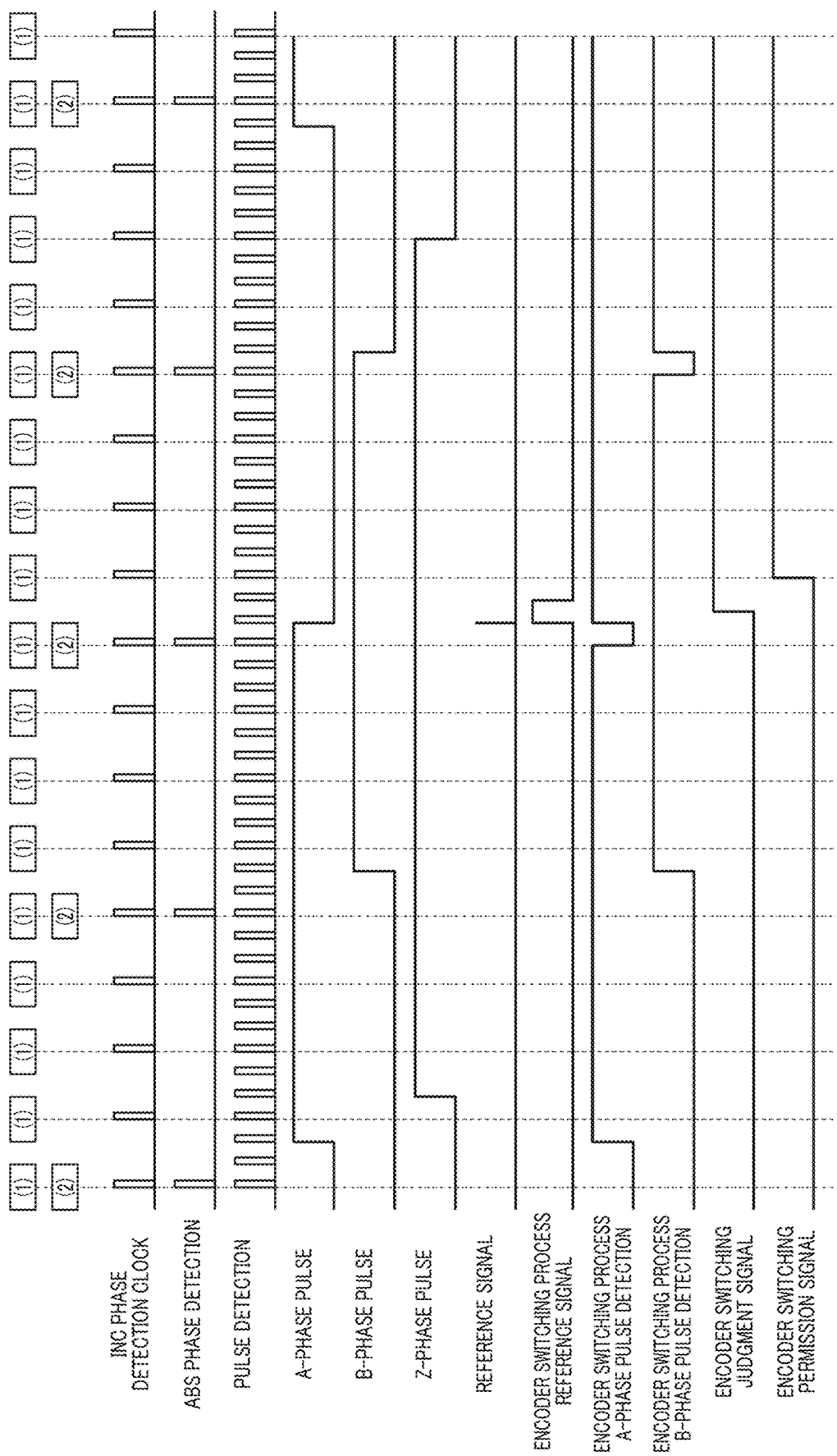
FIG. 15 is an output signal timing chart of an encoder switching process (an encoder switching permission signal OFF→ON) according to the embodiment 2.

FIG. 15 illustrates a timing chart when the encoder switching permission signal is changed from 0 to 1. When the encoder switching process A-phase and B-phase pulse detections are both 1 and the encoder switching process reference signal is 1, the encoder switching judgment signal becomes 1. In a state in which the encoder switching judgment signal is 1, when the INC phase detection clock becomes 1, the encoder switching permission signal becomes 1.

Figure 16:
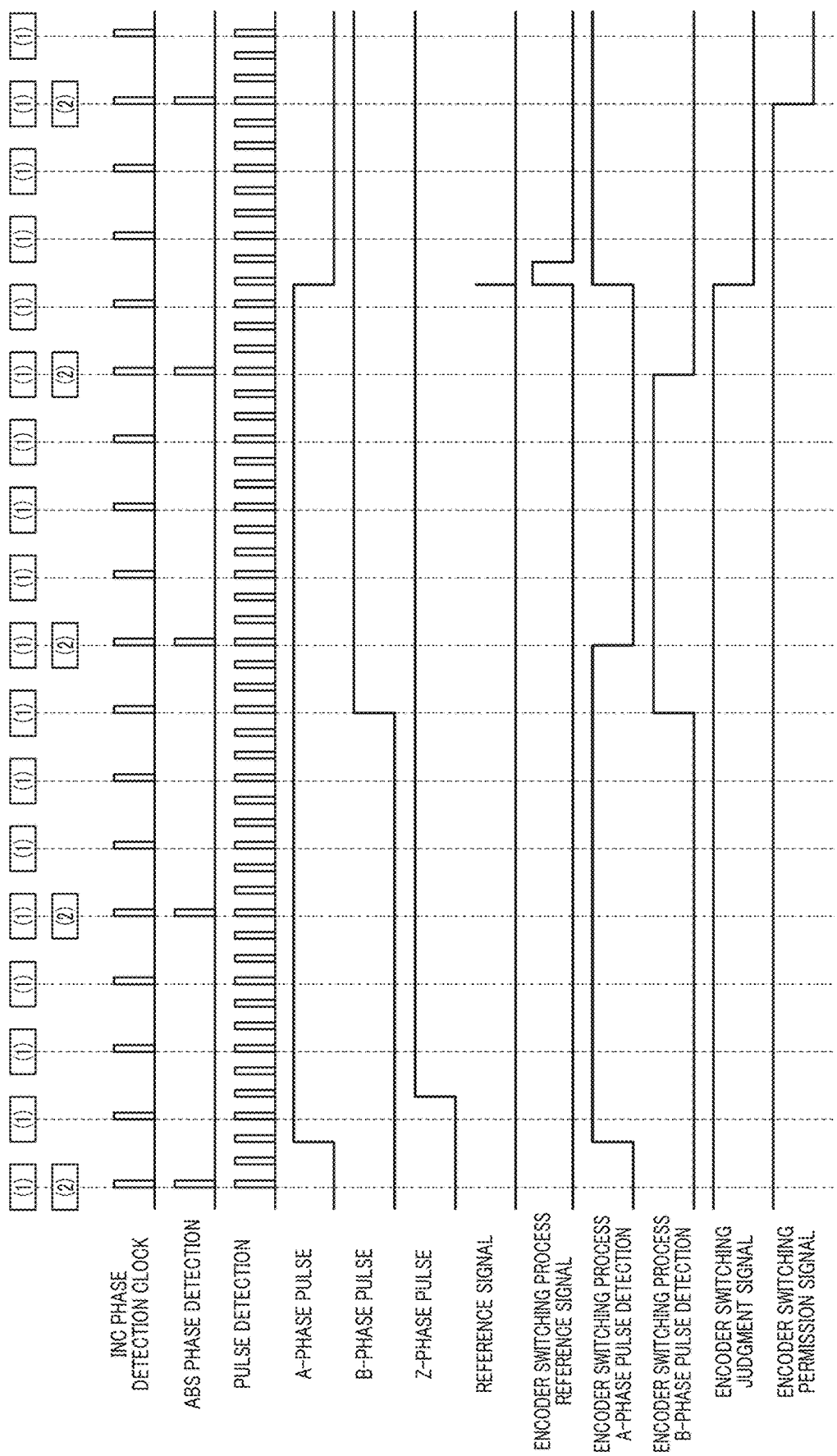
FIG. 16 is an output signal timing chart of an encoder switching process (the encoder switching permission signal ON→OFF) according to the embodiment 2.

FIG. 16 illustrates a timing chart when the encoder switching permission signal is changed from 1 to 0. In a state in which at least one of the encoder switching process A-phase and B-phase pulse detections is 0, when the reference signal is 1, the encoder switching judgment signal becomes 0. In a state in which the encoder switching judgment signal is 0, when the ABS phase detection clock becomes 1, the encoder switching permission signal becomes 0. The encoder switching judgment signal changes each time the reference signal is updated. With this, the switching of the encoder does not occur during one rotation (revolution). Therefore, frequent switching of the encoder due to change in the rotation speed can be prevented.

Figure 17:
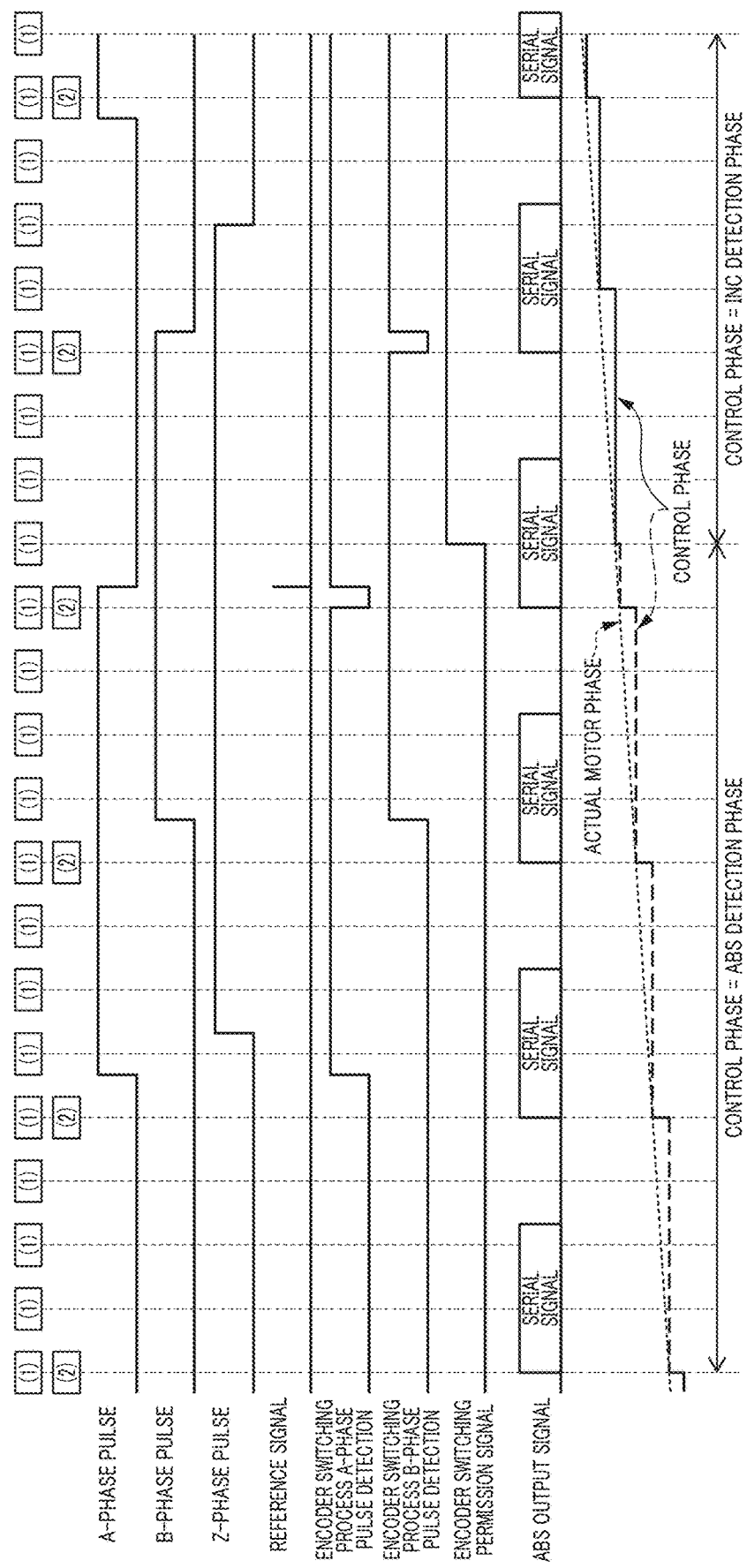
FIG. 17 is a drawing showing encoder phases at a time of switching of ABS→INC according to the embodiment 2.
Figure 18:
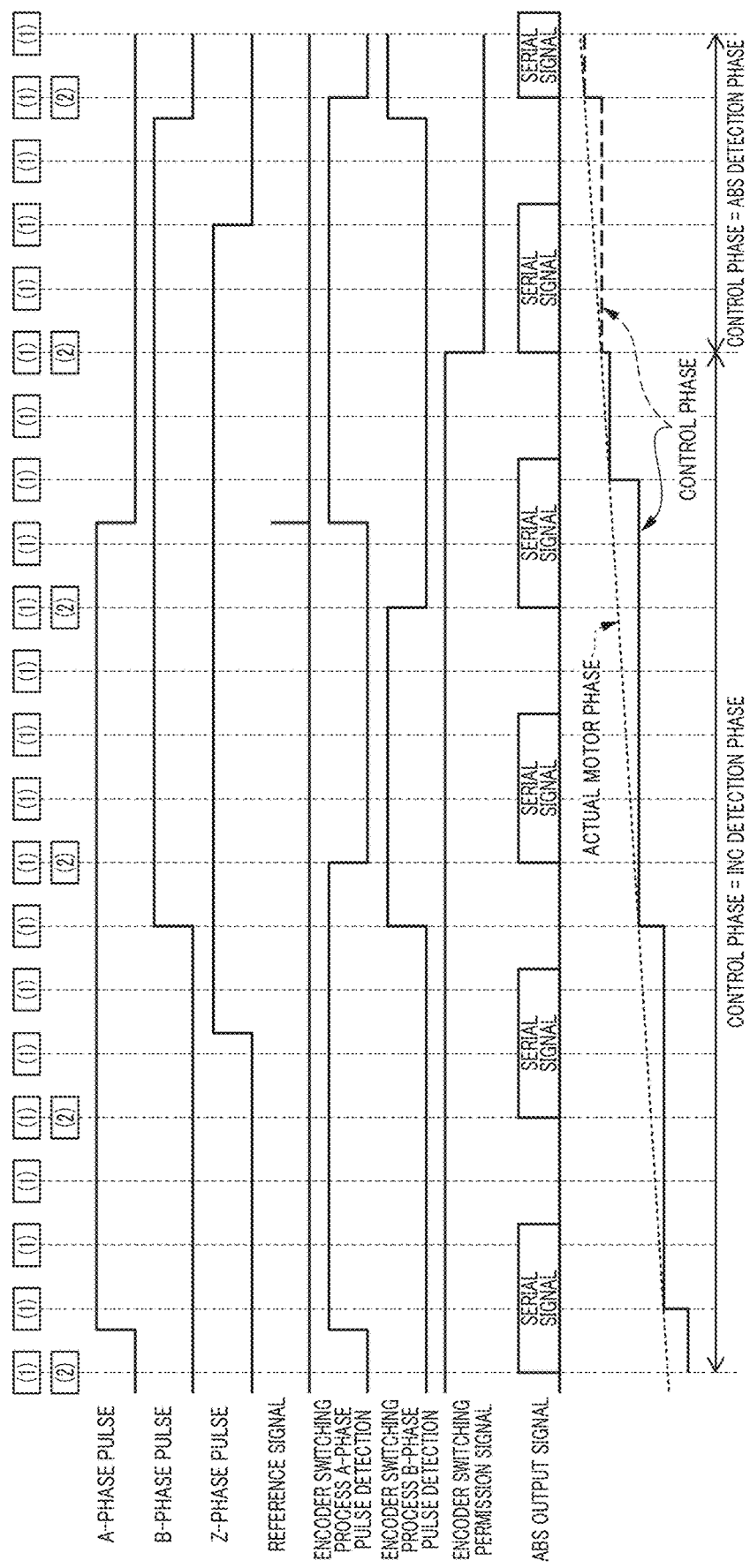
FIG. 18 is a drawing showing encoder phases at a time of switching of INC→ABS according to the embodiment 2.

FIGS. 17 and 18 illustrate the encoder phase at a time of the switching according to the embodiment 2. (1) is an INC detection cycle, and (2) is an ABS detection cycle. It can be seen that the INC detection phase is updated within the ABS detection cycle and also the reference signal occurs, then the control phase is switched to the INC phase. Further, in a case of the switching from the INC to the ABS, it can be seen that the INC detection phase is not updated within the ABS detection cycle and also the reference signal occurs, then the control phase is switched to the ABS phase.

By performing the switching in this manner, the encoder detection phase can be switched while the control phase is capturing an actual motor phase.

Embodiment 3

In an embodiment 3, the signal used for the processes of the up-counters 31*a* and 31*b* for the A-phase and B-phase pulse detections in the embodiment 2 is changed from the ABS phase detection clock to the INC phase detection clock.

Figure 19:
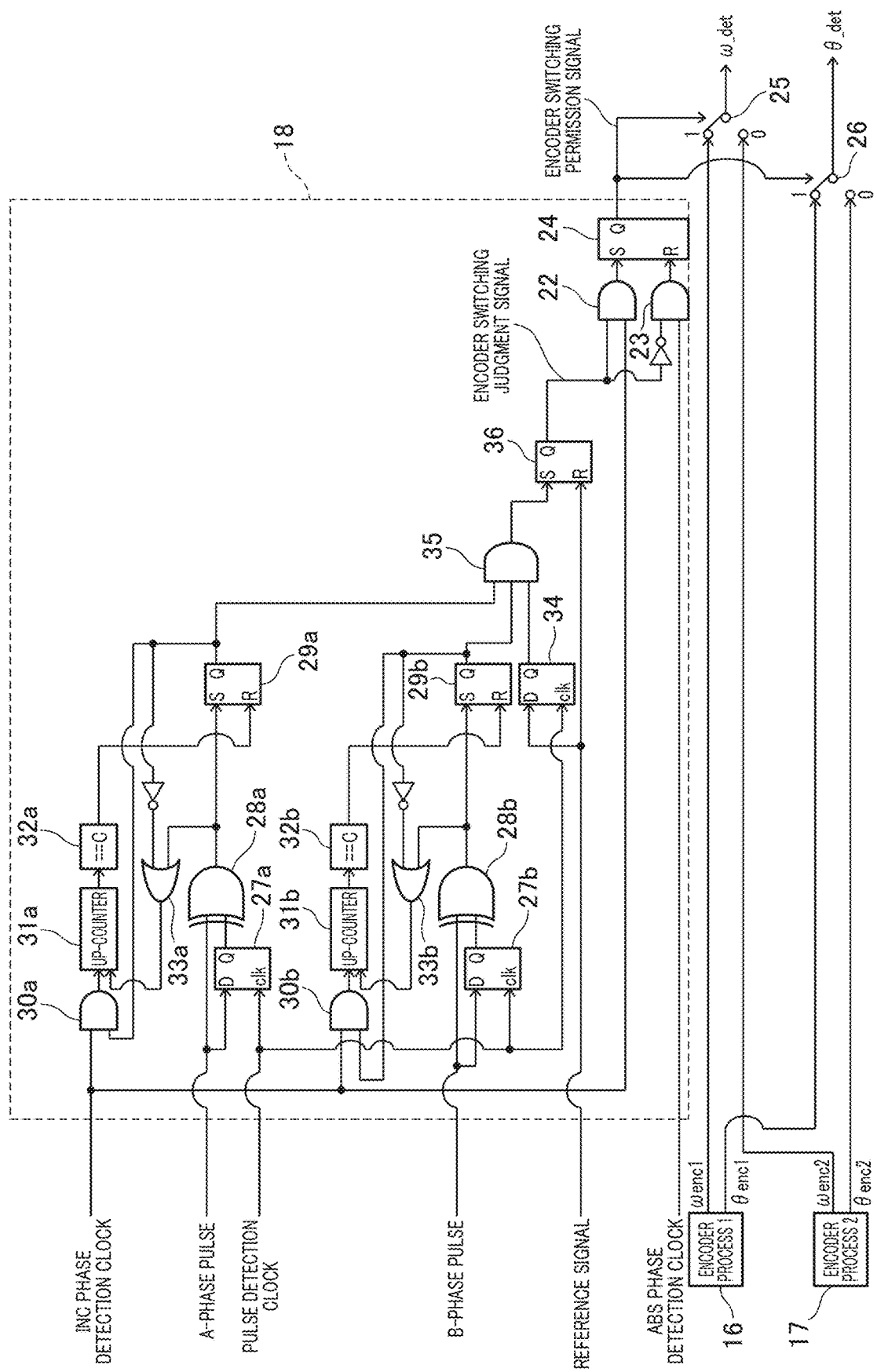
FIG. 19 is a block diagram showing an encoder switching operation process unit according to an embodiment 3.

FIG. 19 illustrates an encoder switching process block diagram according to the embodiment 3. Only changes from the embodiment 2 will be described.

An AND element 30*a* outputs a logical product (an AND) of an output of a first RS flip-flop circuit 29*a* and the INC phase detection clock. An up-counter 31*a* for the A-phase pulse detection inputs and counts the output of the AND element 30*a*. A comparator 32*a* outputs a reset signal to the first RS flip-flop circuit 29*a* when a counter value becomes C. The B-phase is also processed in the same manner.

It is detected that the detection signal of the INC is updated earlier than the ABS phase detection cycle using the INC phase detection clock. A value of C which is compared with an output of the up-counter is the following expression (5).

[Expression 5]

$$C = \frac{ABS \text{ detection cycle}}{INC \text{ detection cycle}} + 1 \qquad (5)$$

Figure 20:
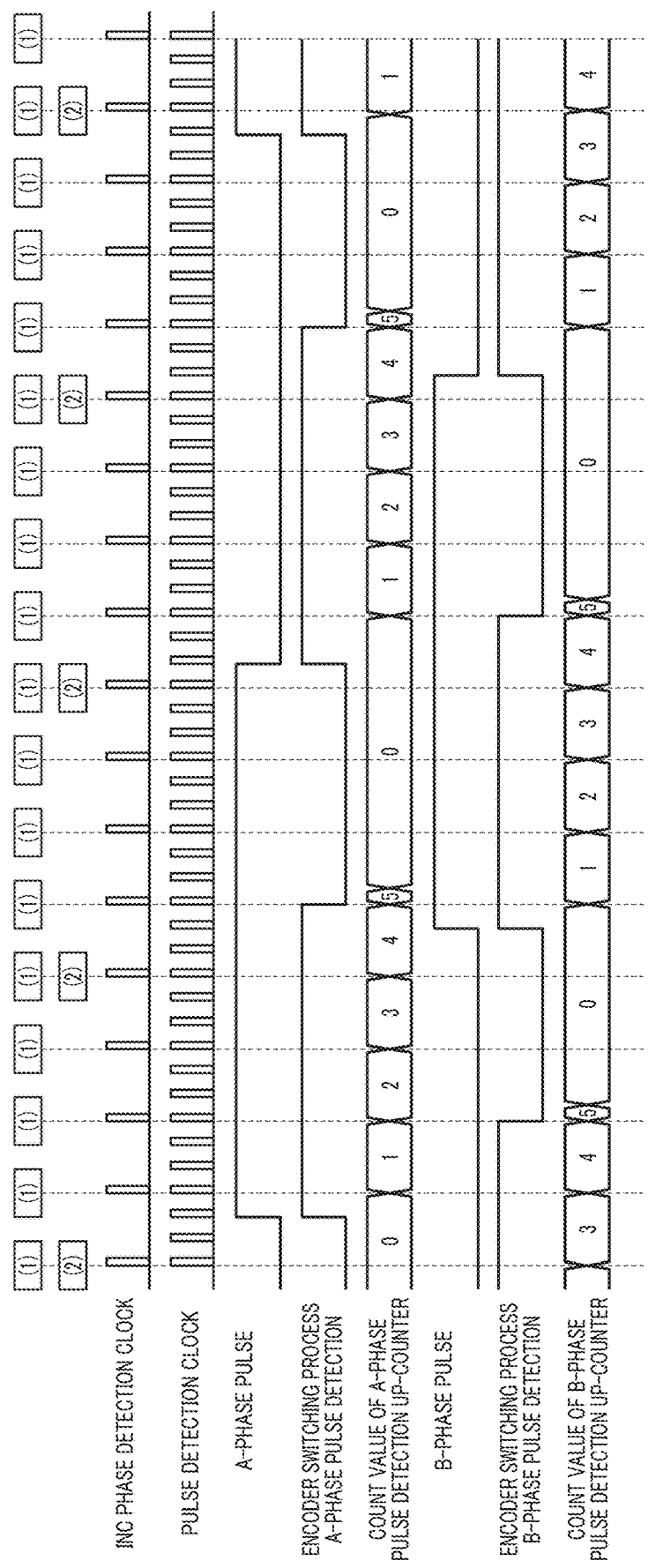
FIG. 20 is a timing chart showing an encoder switching process A-phase pulse detection and an encoder switching process B-phase pulse detection according to the embodiment 3.

FIG. 20 illustrates a timing chart of the encoder switching process A-phase pulse detection and the encoder switching process B-phase pulse detection according to the embodiment 3. In the present embodiment 3, the value of C is 5.

The encoder switching process A-phase pulse detection is set to 1 when detecting the rising edge/falling edge of the A-phase pulse detected at each pulse detection clock. Afterwards, the count value of the A-phase pulse detection up-counter increases by one at each INC phase detection clock.

When the count value becomes 5, the encoder switching process A-phase pulse detection is cleared. Also as can be seen from the timing chart, in a case where the count value is 5, the A-phase pulse does not change between the ABS phase detection clocks. This indicates that update of the INC detection phase becomes later than that of the ABS detection phase, and resolution of the INC detection phase is lower than that of the ABS detection phase.

Therefore, by performing this reset process, the signal of the encoder switching process A-phase pulse detection is cleared. When detecting the rising edge/falling edge of the A-phase pulse again, the encoder switching process A-phase pulse detection becomes 1. Although the count value of the A-phase pulse detection up-counter increases by one at each INC phase detection clock, when detecting the rising edge/falling edge of the A-phase pulse before the count value becomes 5, the value of the up-counter is cleared and becomes 0.

By clearing the count value by or at the detection of the rising edge/falling edge of the A-phase pulse, if the update of the INC detection phase is faster (earlier) than that of the ABS detection phase, the encoder switching process A-phase pulse detection is made not to be cleared. The encoder switching process B-phase pulse detection is also operated in the same manner.

Figure 21:
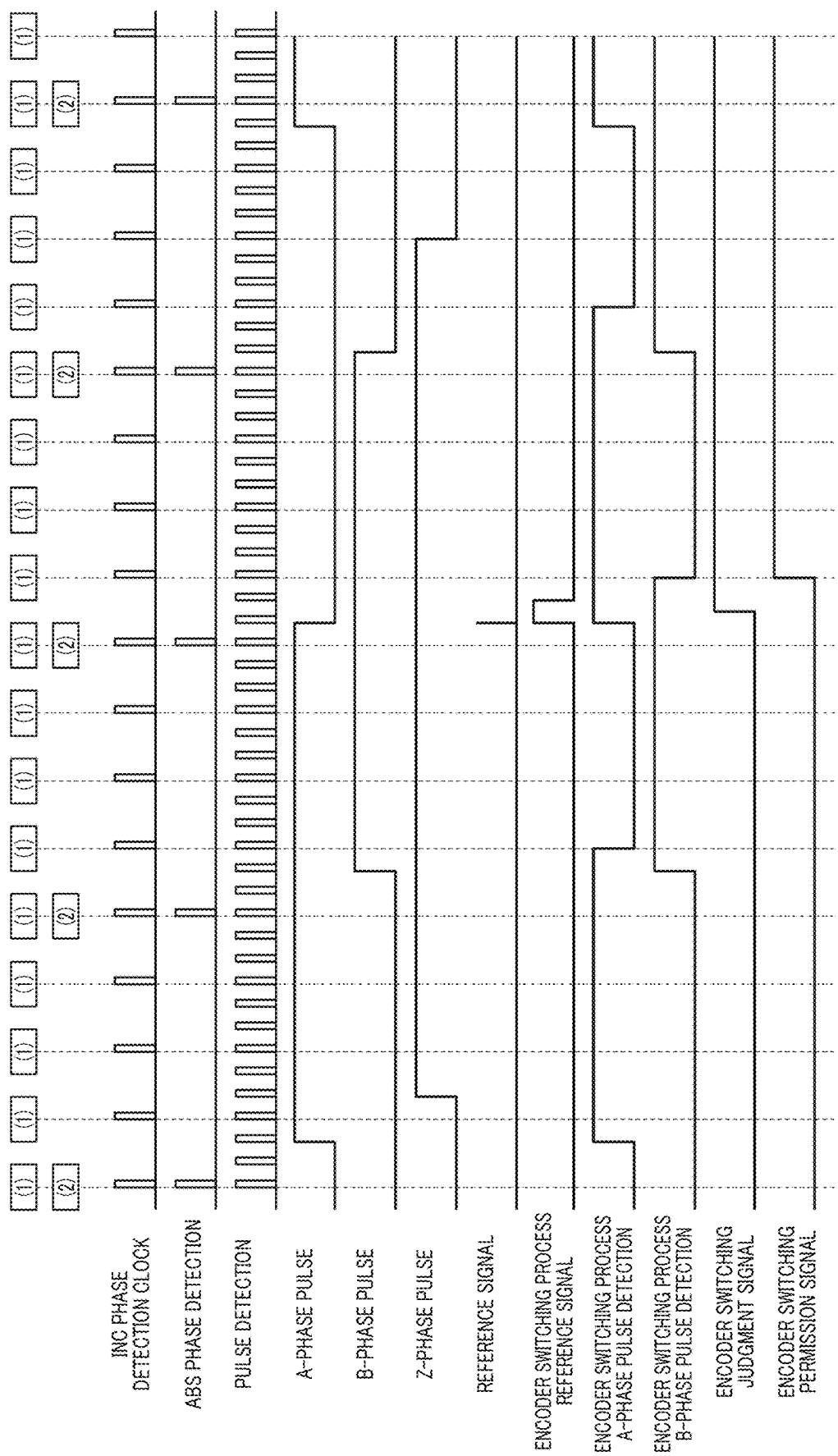
FIG. 21 is an output signal timing chart of an encoder switching process (an encoder switching permission signal OFF→ON) according to the embodiment 3.

FIG. 21 illustrates a timing chart when the encoder switching permission signal is changed from 0 to 1. When the encoder switching process A-phase and B-phase pulse detections are both 1 and the encoder switching process reference signal is 1, the encoder switching judgment signal becomes 1. In a state in which the encoder switching judgment signal is 1, when the INC phase detection clock becomes 1, the encoder switching permission signal becomes 1.

Figure 22:
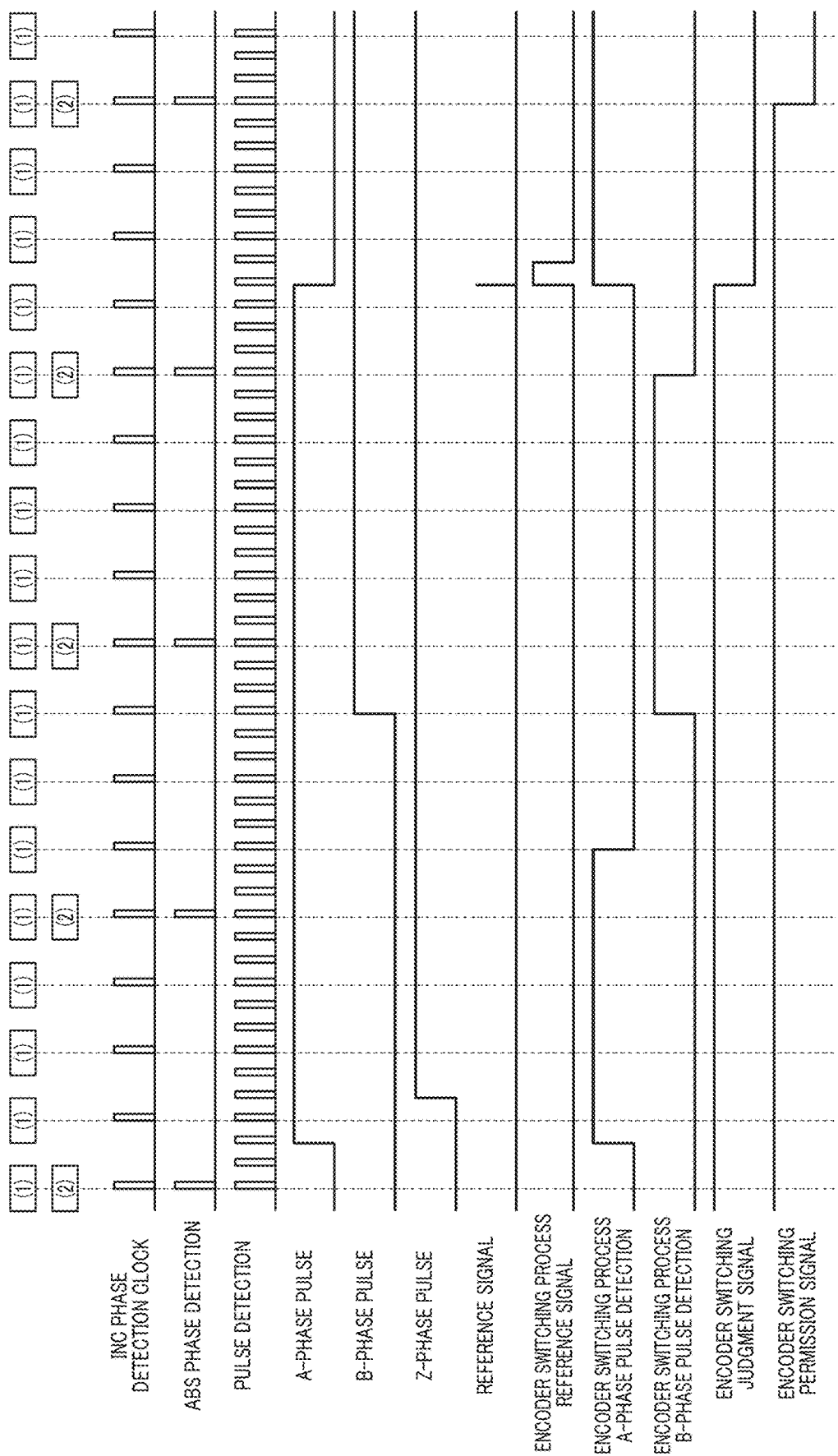
FIG. 22 is an output signal timing chart of an encoder switching process (the encoder switching permission signal ON→OFF) according to the embodiment 3.

FIG. 22 illustrates a timing chart when the encoder switching permission signal is changed from 1 to 0. In a state in which at least one of the encoder switching process A-phase and B-phase pulse detections is 0, when the reference signal is 1, the encoder switching judgment signal becomes 0. In a state in which the encoder switching judgment signal is 0, when the ABS phase detection clock becomes 1, the encoder switching permission signal becomes 0. The encoder switching judgment signal changes each time the reference signal is updated.

Figure 23:
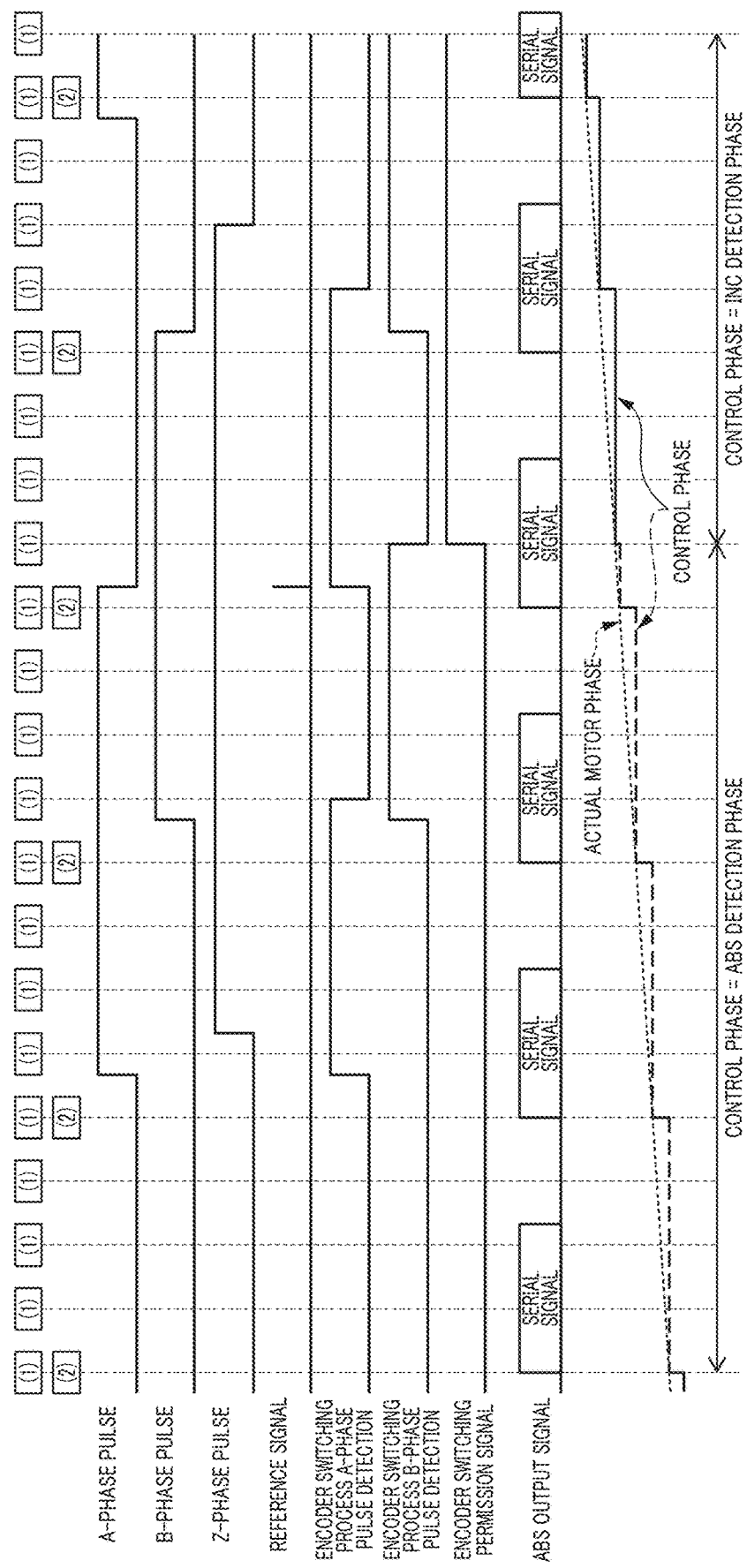
FIG. 23 is a drawing showing encoder phases at a time of switching of ABS→INC according to the embodiment 3.
Figure 24:
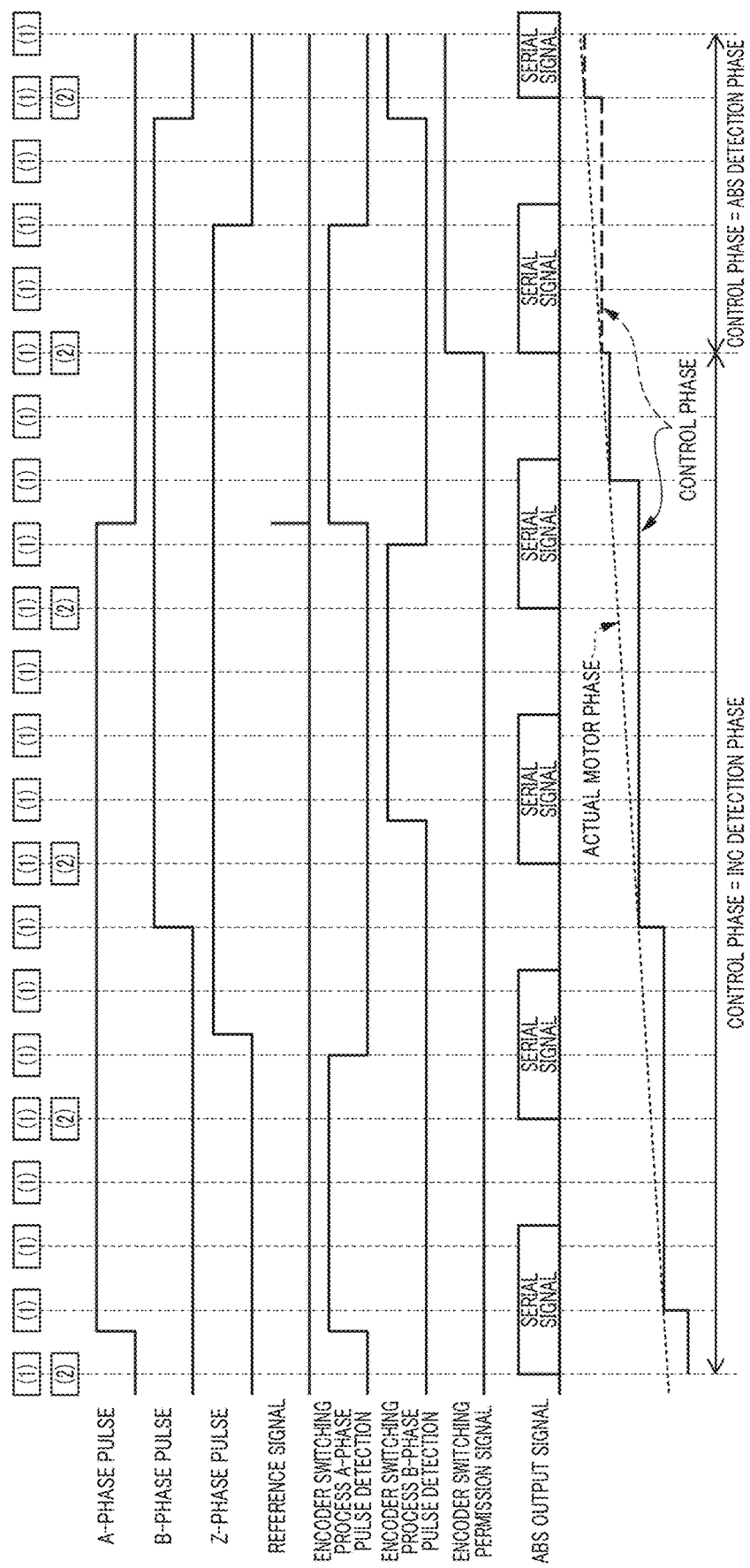
FIG. 24 is a drawing showing encoder phases at a time of switching of INC→ABS according to the embodiment 3.

FIGS. 23 and 24 illustrate the encoder phase at a time of the switching according to the embodiment 3. (1) is an INC detection cycle, and (2) is an ABS detection cycle. It can be seen that the INC detection phase is updated within the ABS detection cycle and also the reference signal occurs, then the control phase is switched to the INC phase. Further, in a case of the switching from the INC to the ABS, it can be seen that the INC detection phase is not updated within the ABS detection cycle and also the reference signal occurs, then the control phase is switched to the ABS phase.

By performing the switching in this manner, it can be seen that the encoder detection phase can be switched while the control phase is capturing an actual motor phase.

Embodiment 4

In an embodiment 4, as a configuration, an encoder switching process pulse detection for one phase is deleted in the encoder switching process block diagrams of the embodiment 2 and the embodiment 3, and a method in which process is simplified will be described. In the present embodiment 4, as the output pulse of the INC, FIG. 2 and FIG. 3 are assumed.

Figure 25:
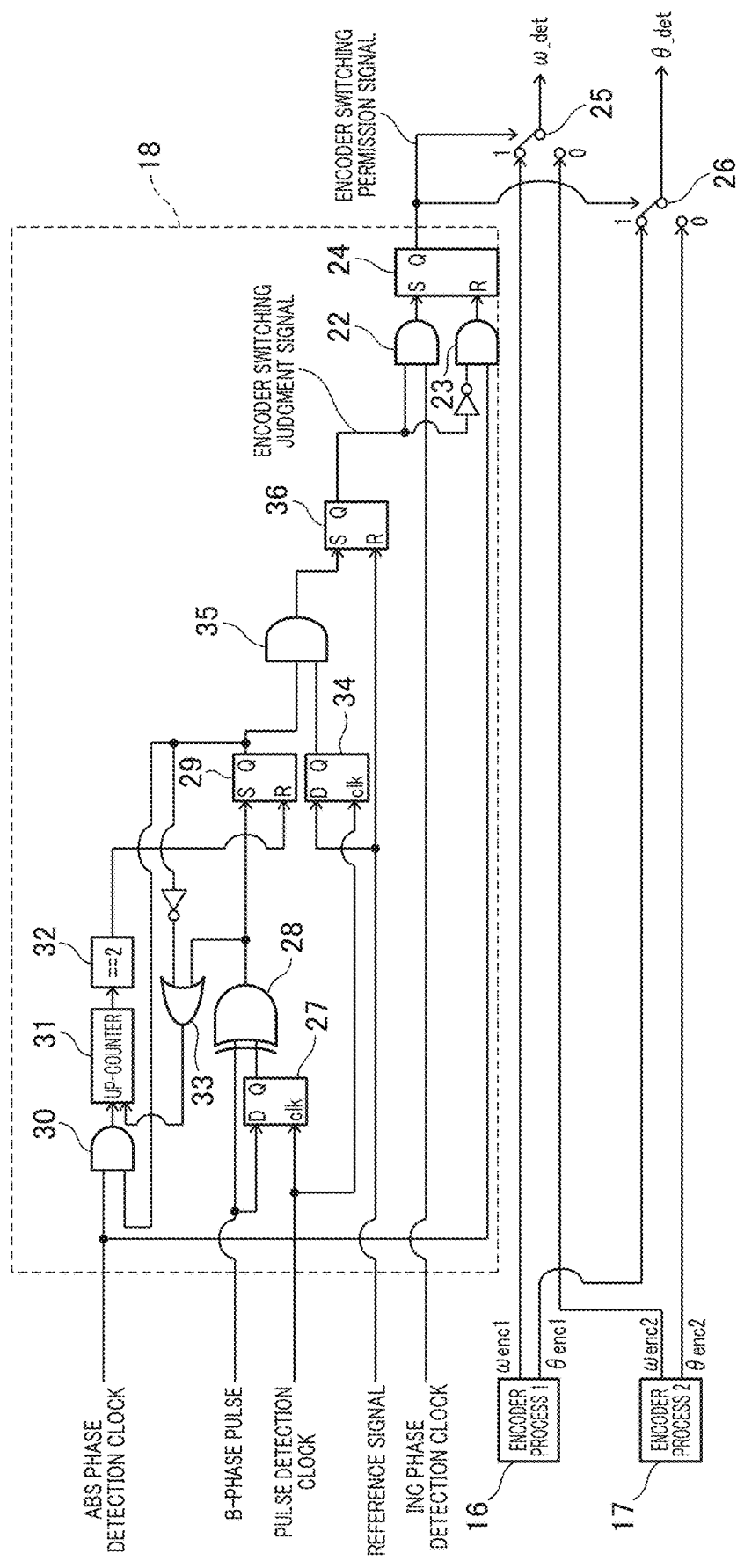
FIG. 25 is a block diagram showing an encoder switching operation process unit according to an embodiment 4.

FIG. 25 illustrates a block diagram of the encoder switching operation process unit 18 according to the embodiment 4. In the present embodiment 4, although the configuration in which the encoder switching process pulse detection for one phase is deleted from the method of the embodiment 2 will be described, the configuration can also be applied to the method of the embodiment 3 in the same manner. Further, in the present embodiment 4, although a method performed only by the encoder switching process B-phase pulse detection will be described, it is the same as a method performed only by the encoder switching process A-phase pulse detection.

In a case of the assumed INC signal form, the reference signal is generated by detecting the rising edge/falling edge of the A-phase pulse or the rising edge/falling edge of the B-phase pulse while the Z-phase pulse is rising. The block diagram of a case of FIG. 25 is a block diagram in which it is assumed that the reference signal is generated by detecting the rising edge/falling edge of the A-phase pulse while the Z-phase pulse is rising.

The encoder switching operation process unit 18 of the embodiment 4 generates the encoder switching permission signal by the signal, which is not used for generating the reference signal, of either the A-phase pulse or the B-phase pulse, the reference signal, the INC phase detection clock (the detection cycle of the first position/rotation detector) and the ABS phase detection clock (the detection cycle of the second position/rotation detector), and performs the encoder switching according to the encoder switching permission signal.

Therefore, when the reference signal becomes 1, the rising edge/falling edge of the A-phase pulse is detected. By taking a logical product (an AND) of the encoder switching process B-phase pulse detection and the reference signal, the signal becomes a signal including the detection of the rising edge/falling edge of the A-phase pulse. Thus, there is no need to perform the encoder switching process A-phase pulse detection.

Embodiment 5

In the embodiments 1 to 4, by using the plurality of position/rotation detectors (the plurality of encoders) and selecting an optimum encoder according to the operating condition, the current and the rotation speed of the motor can be controlled with high accuracy. However, since the encoder is switched, there is a possibility that malfunction such as an occurrence of abrupt acceleration/deceleration will occur at the time of the switching.

In the case where the encoder switching operation process unit 18 performs the encoder switching process of the first and second encoder detection phases θenc1 and θenc2 and the first and second encoder detection rotation speeds ωenc1 and ωenc2, the encoder switching operation process unit 18 selects which signal is used, then obtains the control phase θ_det and the detection rotation speed ω_det. In the case where the encoder switching operation process unit 18 performs the weight operation process, the encoder switching operation process unit 18 performs the weight operation according to the rotation speed (frequency), then calculates the control phase θ_det and the detection rotation speed ω_det.

In the embodiment 5, as a configuration, the encoder switching operation process unit 18 of FIG. 1 does not perform the encoder switching process, but adjusts a ratio (or a proportion) of each encoder detection value by performing the weight operation process. However, the "encoder switching process" and the "weight operation process" of the embodiment 1 could be performed in parallel, then an output of either the "encoder switching process" or the "weight operation process" could be used as appropriate.

The encoder switching operation process unit 18 of the embodiment 5 calculates a weighting factor on the basis of the detection rotation speed, the detection cycle of the first position/rotation detector and the detection cycle of the second position/rotation detector, and adjusts a ratio of the signal between the first position/rotation detector and the second position/rotation detector according to the weighting factor, then outputs a signal obtained by adding adjusted signals.

Figure 26:
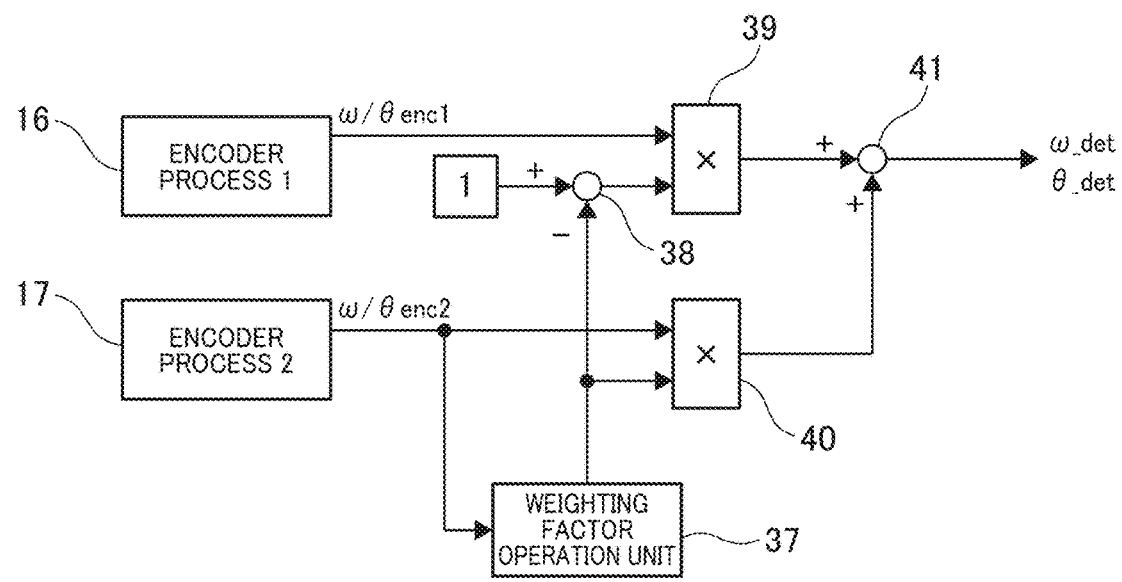
FIG. 26 is a block diagram showing an encoder switching operation process unit according to an embodiment 5.
Figure 27:
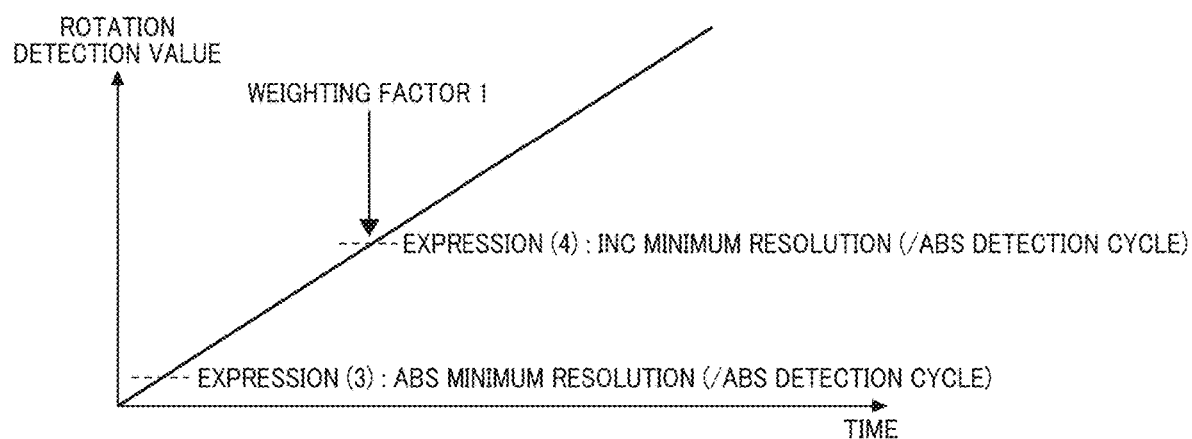
FIG. 27 is a drawing showing a relationship between weight operation process and rotation speed.

FIG. 26 illustrates contents of the operation process of the encoder switching operation process unit 18 of the embodiment 5. FIG. 27 illustrates an image of the weight operation process, also depicts a relationship between the weight operation process and the rotation speed.

A weighting factor operation unit 37 inputs the second encoder detection rotation speed ωenc2 and the second encoder detection phase θenc2, and outputs the weighting factor. A subtractor 38 subtracts the weighting factor from 1.

A multiplier 39 multiplies the first encoder detection rotation speed ωenc1 and the first encoder detection phase θenc1 by the output of the subtractor 38. A multiplier 40 multiplies the second encoder detection rotation speed ωenc2 and the second encoder detection phase θenc2 by the weighting factor. An adder 41 adds the outputs of the multipliers 39 and 40. An output of the adder 41 becomes the detection rotation speed ω_det and the control phase θ_det.

The weighting factor operation unit 37 inputs the detection values of the second encoder process unit 17, calculates the weighting factor according to the detection values and outputs the weighting factor. Here, as the second encoder process unit 17, the ABS is assumed, and as the first encoder process unit 16, the INC is assumed.

When the rotation speed is the rotation speed of the expression (4) of the embodiment 1 or more, update of the INC detection phase is faster (earlier) than that of the ABS detection phase. Therefore, it can be said that resolution of the INC detection phase becomes higher than that of the ABS detection phase at this point. On the other hand, the expression (3) becomes the ABS minimum resolution.

Therefore, a rotation speed calculated by the expression (4) is set as the weighting factor "1", and the detection rotation speed ω_det is calculated. As a start point, a rotation speed calculated by the expression (3) is set as the minimum value of the weighting factor, and the weighting factor is linear.

That is, the encoder switching operation process unit 18 of the embodiment 5 determines the weighting factor according to the value of the detection rotation speed, sets one, which is a lower value, of the rotation speed minimum resolutions of the INC and the ABS (the first and second position/rotation detectors) according to the ABS phase detection clock (the detection cycle of the second position/rotation detector) to the minimum value, and sets the other, which is a higher value, to 1 of the maximum value.

According to the embodiment 5, instead of selecting use/non-use of the encoder process, the ratio (or the proportion) (the weighting factor) of use of each encoder process value can be changed. With this, it is possible to prevent a sudden change of the detection value which occurs when switching the ABS encoder and the INC encoder.

Embodiment 6

In an embodiment 6, a hysteresis unit is provided in the encoder switching operation process unit 18 of the embodiment 5.

In the embodiment 5, the INC becomes dominant with the rotation speed determined by the expression (4) being a boundary. Here, hysteresis is provided so that the operation process can be applied to applications where the rotation speed frequently changes. As a hysteresis width, a detection error including a rotation detector error is set as a range, and a weighting factor which has changed once within this range is latched.

Figure 28:
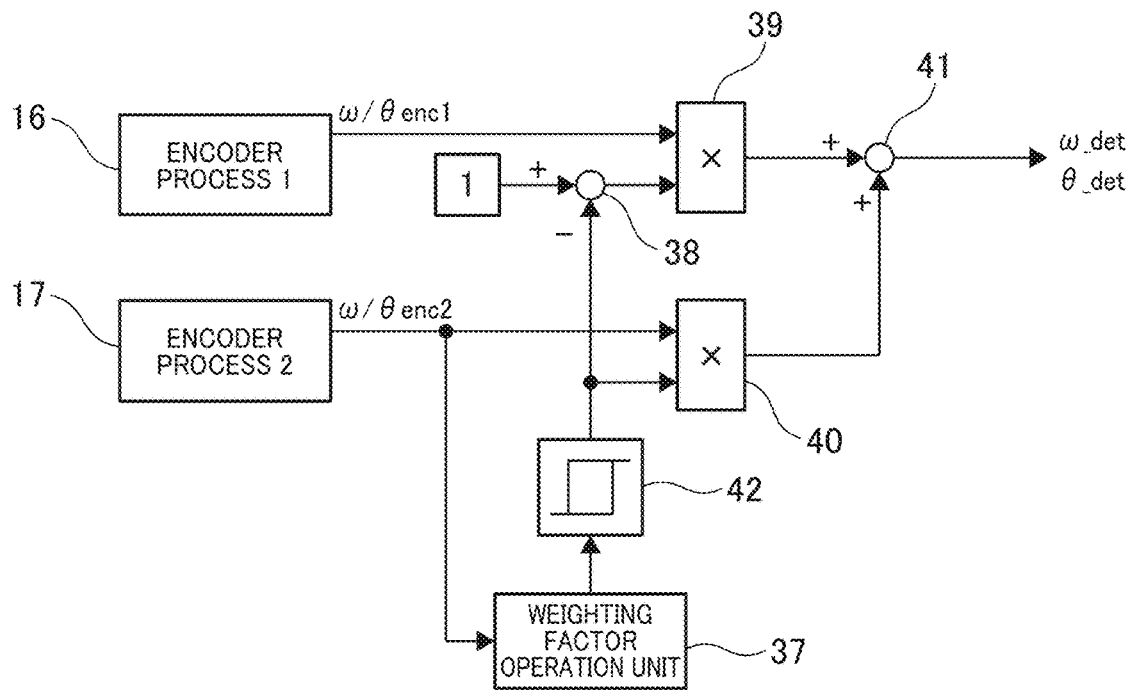
FIG. 28 is a block diagram showing an encoder switching operation process unit according to an embodiment 6.

FIG. 28 illustrates contents of the operation process. A hysteresis unit 42 provides a weighting factor output from the weighting factor operation unit 37 with the hysteresis. An output of the hysteresis unit 42 is input to the subtractor 38 and the multiplier 40. Processes after this are the same as those of the embodiment 5.

By the embodiment 6, the weighting factor does not change unless the weighting factor exceeds the hysteresis width when the weighting factor changes. With this, even in the applications where acceleration and deceleration of the rotation speed are repeated, a sudden change of the weighting factor can be prevented, thereby preventing a sudden change of the detection value.

Embodiment 7

In the embodiment 1, the switching is performed using the reference signal. However, as a method of performing the switching without using the reference signal, an embodiment 7 will be described. (The embodiment 5 could operate in parallel with the encoder switching process of the embodiment 1.)

The embodiment 7 has a comparison unit 43 that compares the output of the first encoder process unit 16 and the output the second encoder process unit 17 in parallel with the weight operation process of the embodiment 5. An output of this comparison unit 43 is input to the weighting factor operation unit 37. The weighting factor "1" is set to a rotation speed in the expression (2), and the weight operation process is performed from the expression (3) to the expression (2).

Figure 29:
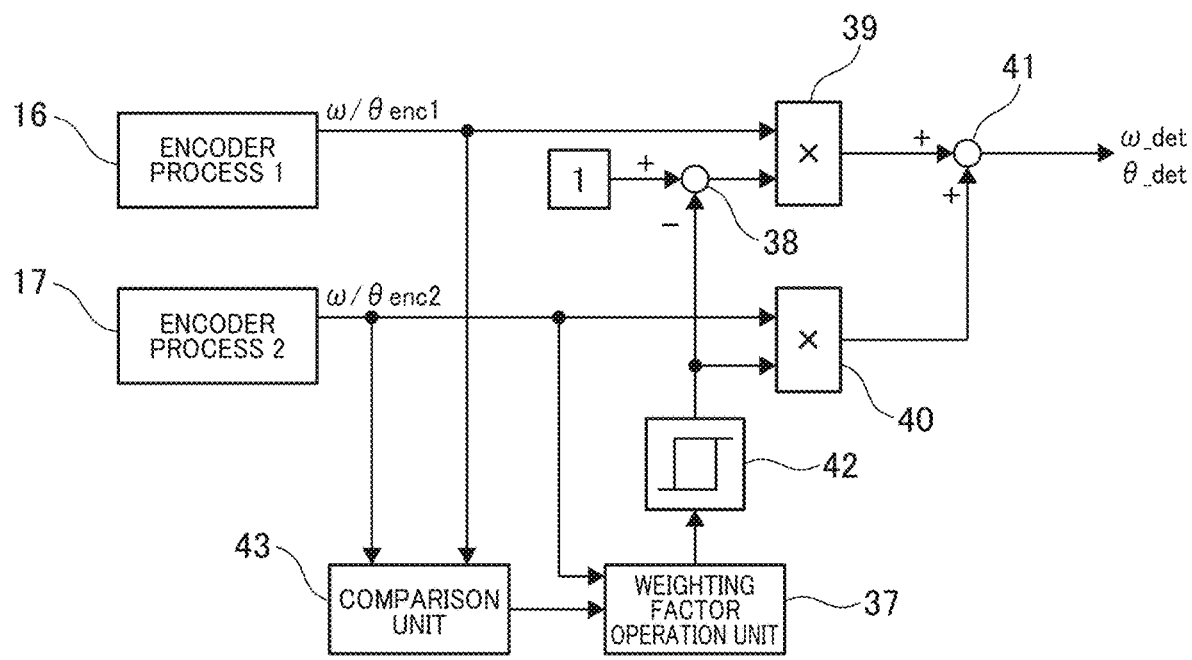
FIG. 29 is a block diagram showing an encoder switching operation process unit according to an embodiment 7.
Figure 30:
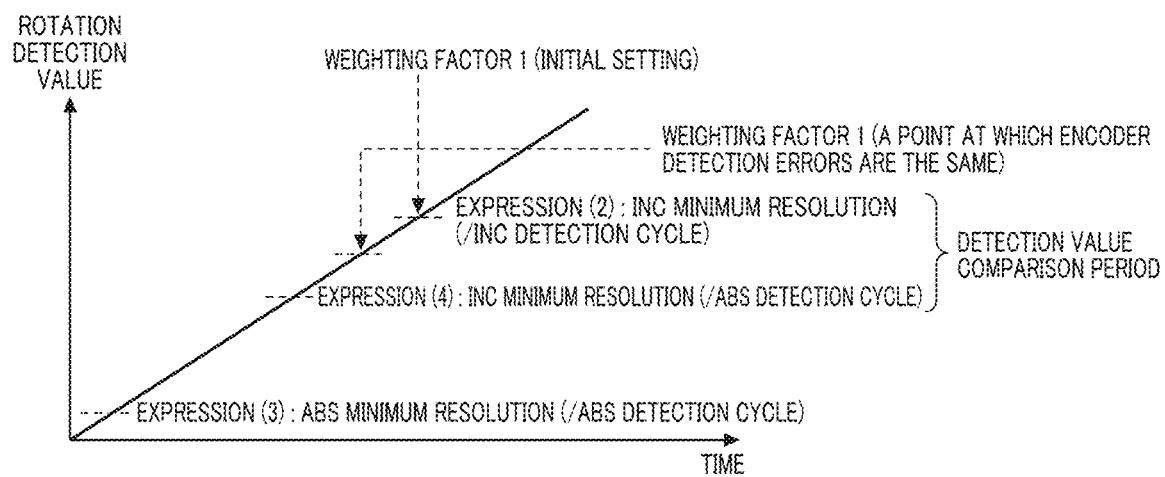
FIG. 30 is a drawing showing an encoder detection comparison unit and the weight operation process.

FIG. 29 illustrates contents of the operation process. The comparison unit 43 compares the first encoder detection rotation speed ωenc1, the first encoder detection phase θenc1 and the second encoder detection rotation speed ωenc2, the second encoder detection phase θenc2 respectively. Processes after this are the same as those of the embodiment 6.

The detections of the first encoder process unit 16 and the second encoder process unit 17 are compared between the detection rotation speeds calculated by the expressions (2) and (4).

If a difference in the detection rotation speed between the first encoder process unit 16 and the second encoder process unit 17 is within the detection accuracy, regardless of the weighting factor at that time, the weighting factor is forcibly increased to "1", then the switching is performed so that only the first encoder process unit 16 is enabled. With this process, a difference in the detection cycle between the first encoder process unit 16 and the second encoder process unit 17 can be switched at a timing when a difference in the encoder resolution is small, then linearity can be maintained with high accuracy.

The encoder switching operation process unit 18 of the embodiment 7 determines the weighting factor according to the detection rotation speed, sets one, which is a lower value, of the rotation speed minimum resolutions of the INC and the ABS (the first and second position/rotation detectors) according to the ABS phase detection clock (the detection cycle of the second position/rotation detector) to the minimum value, and sets one, which is a higher value, of the rotation speed minimum resolutions of the INC and the ABS (the first and second position/rotation detectors) according to the INC phase detection clock (the detection cycle of the first position/rotation detector) to 1 of the maximum value.

Further, the encoder switching operation process unit 18 of the embodiment 7 compares the detection rotation speeds of the INC and the ABS (the first and second position/rotation detectors), and increases the weighting factor to "1" if the difference in the detection rotation speed between the INC and the ABS is within the detection error range.

Although the present invention has been described in detail only for the above embodiments, it is obvious to those skilled in the art that various modifications and corrections can be made within the scope of the technical idea of the present invention. As a matter of course, such modifications and corrections belong to the scope of the claim.

The invention claimed is:

1. A power conversion device that drives a motor comprising:
　a first position and rotation detector detecting a phase and a rotation speed of the motor;
　a second position and rotation detector detecting the phase and the rotation speed of the motor, whose resolution per rotation of the motor is higher than that of the first position and rotation detector but whose detection cycle is slower than that of the first position and rotation detector; and
　an encoder switching operation process unit configured to switch between a signal of the first position and rotation detector and a signal of the second position and rotation detector and output, as a control phase and a detection rotation speed, the signal of the first position and rotation detector or the signal of the second position and rotation detector, wherein
　motor drive control is performed using the control phase and the detection rotation speed, and
　the encoder switching operation process unit is configured to
　　compare the detection rotation speed and a threshold value, and output an encoder switching judgment signal which is turned from 0 to 1 when the detection rotation speed exceeds the threshold value from a state in which the detection rotation speed is the threshold value or less and also a reference signal becomes ON, and which is turned from 1 to 0 when the detection rotation speed becomes less than the threshold value from a state in which the detection rotation speed is greater than the threshold value and also the reference signal becomes ON,
　　generate an encoder switching permission signal which is turned ON at a detection cycle of the first position and rotation detector while the encoder switching judgment signal is 1, and which is turned OFF at a detection cycle of the second position and rotation detector while the encoder switching judgment signal is 0, and
　　output the signal of the first position and rotation detector when the encoder switching permission signal is ON, and output the signal of the second position and rotation detector when the encoder switching permission signal is OFF.

2. A power conversion device that drives a motor comprising:
　a first position and rotation detector detecting a phase and a rotation speed of the motor;
　a second position and rotation detector detecting the phase and the rotation speed of the motor, whose resolution per rotation of the motor is higher than that of the first position and rotation detector but whose detection cycle is slower than that of the first position and rotation detector; and
　an encoder switching operation process unit configured to switch between a signal of the first position and rotation detector and a signal of the second position and rotation detector and output, as a control phase and a detection rotation speed, the signal of the first position and rotation detector or the signal of the second position and rotation detector, wherein
　motor drive control is performed using the control phase and the detection rotation speed,
　the encoder switching operation process unit is configured to
　　generate an encoder switching permission signal by an A-phase pulse and a B-phase pulse of the first position and rotation detector, a reference signal, a detection cycle of the first position and rotation detector and a detection cycle of the second position and rotation detector, and
　　output the signal of the first position and rotation detector when the encoder switching permission signal is ON, and output the signal of the second position and rotation detector when the encoder switching permission signal is OFF, and
　the encoder switching operation process unit has
　　an A-phase first RS flip-flop circuit configured to latch for the phase detection cycle of the second position and rotation detector when a rising edge/falling edge of the A-phase pulse occurs;
　　a B-phase first RS flip-flop circuit configured to latch for the phase detection cycle of the second position and rotation detector when a rising edge/falling edge of the B-phase pulse occurs;
　　an A-phase up-counter configured to count, as an input, a logical product of an output of the A-phase first RS flip-flop circuit and the detection cycle of the second position and rotation detector and input, as a reset signal, a logical OR of a logical NOT of the output of the A-phase first RS flip-flop circuit and the rising edge/falling edge of the A-phase pulse;
　　a B-phase up-counter configured to count, as an input, a logical product of an output of the B-phase first RS flip-flop circuit and the detection cycle of the second position and rotation detector and input, as a reset signal, a logical OR of a logical NOT of the output of the B-phase first RS flip-flop circuit and the rising edge/falling edge of the B-phase pulse;
　　an A-phase comparator configured to output the reset signal to the A-phase first RS flip-flop circuit when a counter of the A-phase up-counter becomes 2; and
　　a B-phase comparator configured to output the reset signal to the B-phase first RS flip-flop circuit when a counter of the B-phase up-counter becomes 2.

3. A power conversion device that drives a motor comprising:
　a first position and rotation detector detecting a phase and a rotation speed of the motor;
　a second position and rotation detector detecting the phase and the rotation speed of the motor, whose resolution per rotation of the motor is higher than that of the first position and rotation detector but whose detection cycle is slower than that of the first position and rotation detector; and an encoder switching operation process unit configured to switch between a signal of the first position and rotation detector and a signal of the second position and rotation detector and output, as a control phase and a detection rotation speed, the signal of the first position and rotation detector or the signal of the second position and rotation detector, wherein motor drive control is performed using the control phase and the detection rotation speed, the encoder switching operation process unit is configured to generate an encoder switching permission signal by an A-phase pulse and a B-phase pulse of the first position and rotation detector, a reference signal, a detection cycle of the first position and rotation detector and a detection cycle of the second position and rotation detector, and output the signal of the first position and rotation detector when the encoder switching permission signal is ON, and output the signal of the second position and rotation detector when the encoder switching permission signal is OFF, and the encoder switching operation process unit has an A-phase first RS flip-flop circuit configured to latch for the phase detection cycle of the second position and rotation detector when a rising edge/falling edge of the A-phase pulse occurs;

a B-phase first RS flip-flop circuit configured to latch for the phase detection cycle of the second position and rotation detector when a rising edge/falling edge of the B-phase pulse occurs;

an A-phase up-counter configured to count, as an input, a logical product of an output of the A-phase first RS flip-flop circuit and the detection cycle of the first position and rotation detector and input, as a reset signal, a logical OR of a logical NOT of the output of the A-phase first RS flip-flop circuit and the rising edge/falling edge of the A-phase pulse;

a B-phase up-counter configured to count, as an input, a logical product of an output of the B-phase first RS flip-flop circuit and the detection cycle of the first position and rotation detector and input, as a reset signal, a logical OR of a logical NOT of the output of the B-phase first RS flip-flop circuit and the rising edge/falling edge of the B-phase pulse;

an A-phase comparator configured to output the reset signal to the A-phase first RS flip-flop circuit when a counter of the A-phase up-counter becomes an expression (5); and a B-phase comparator configured to output the reset signal to the B-phase first RS flip-flop circuit when a counter of the B-phase up-counter becomes an expression (5);

[Expression 5]

$$C = \frac{ABS \text{ detection cycle}}{INC \text{ detection cycle}} + 1 \quad (5)$$

C: counter

ABS detection cycle: detection cycle of second position and rotation detector

INC detection cycle: detection cycle of first position and rotation detector.

4. A power conversion device that drives a motor comprising:

a first position and rotation detector detecting a phase and a rotation speed of the motor;

a second position and rotation detector detecting the phase and the rotation speed of the motor, whose resolution per rotation of the motor is higher than that of the first position and rotation detector but whose detection cycle is slower than that of the first position and rotation detector; and an encoder switching operation process unit configured to switch between a signal of the first position and rotation detector and a signal of the second position and rotation detector and output, as a control phase and a detection rotation speed, the signal of the first position and rotation detector or the signal of the second position and rotation detector, wherein motor drive control is performed using the control phase and the detection rotation speed, the first position and rotation detector is configured to output an A-phase pulse, a B-phase pulse and a Z-phase pulse, the Z-phase pulse is a signal that occurs once per rotation, a reference signal is a signal generated from a relationship between the Z-phase and the A-phase or a signal generated from a relationship between the Z-phase and the B-phase, and the encoder switching operation process unit is configured to generate an encoder switching permission signal by a signal, which is not used for generating the reference signal, of either the A-phase pulse or the B-phase pulse, the reference signal, a detection cycle of the first position and rotation detector and a detection cycle of the second position and rotation detector, and output the signal of the first position and rotation detector when the encoder switching permission signal is ON, and output the signal of the second position and rotation detector when the encoder switching permission signal is OFF.

* * * * *